US010437114B2

(12) United States Patent
Tamaki et al.

(10) Patent No.: US 10,437,114 B2
(45) Date of Patent: Oct. 8, 2019

(54) DISPLAY DEVICE

(71) Applicant: Japan Display Inc., Tokyo (JP)

(72) Inventors: Masaya Tamaki, Tokyo (JP); Hirotaka Hayashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 401 days.

(21) Appl. No.: 15/364,775

(22) Filed: Nov. 30, 2016

(65) Prior Publication Data

US 2017/0153513 A1    Jun. 1, 2017

(30) Foreign Application Priority Data

| Dec. 1, 2015 | (JP) | 2015-234788 |
| Dec. 1, 2015 | (JP) | 2015-234789 |
| Dec. 1, 2015 | (JP) | 2015-234790 |
| Oct. 3, 2016 | (JP) | 2016-195668 |

(51) Int. Cl.
*G02F 1/1343* (2006.01)
*G09G 3/20* (2006.01)

(52) U.S. Cl.
CPC ..... *G02F 1/134309* (2013.01); *G09G 3/2003* (2013.01); *G09G 3/2074* (2013.01); *G02F 2001/134345* (2013.01); *G09G 2300/0426* (2013.01); *G09G 2300/0443* (2013.01); *G09G 2300/0828* (2013.01); *G09G 2300/0857* (2013.01)

(58) Field of Classification Search
CPC combination set(s) only.
See application file for complete search history.

(56) References Cited

U.S. PATENT DOCUMENTS

2014/0285761 A1*  9/2014  Tamaki .............. G09G 3/2074
349/144

FOREIGN PATENT DOCUMENTS

| JP | 2013-186294 | 9/2013 |
| JP | 2014-186283 | 10/2014 |
| JP | 5827970 | 10/2015 |

* cited by examiner

*Primary Examiner* — Robin J Mishler
(74) *Attorney, Agent, or Firm* — K&L Gates LLP

(57) ABSTRACT

According to one embodiment, a display device includes a unit pixel including first to fourth sub-pixels exhibiting different colors, each of the first to fourth sub-pixels includes first to third segments for displaying 3-bit gradation, the first segment being a rectangular region including first to fourth sides, the second segment being an L-letter region located on a side closer to a geometric center of the unit pixel than the first segment and formed along the first and second sides which intersect each other, the third segment being an L-letter region located on a side farther from the geometric center than the first segment and formed along the third and fourth sides which intersect each other.

20 Claims, 21 Drawing Sheets

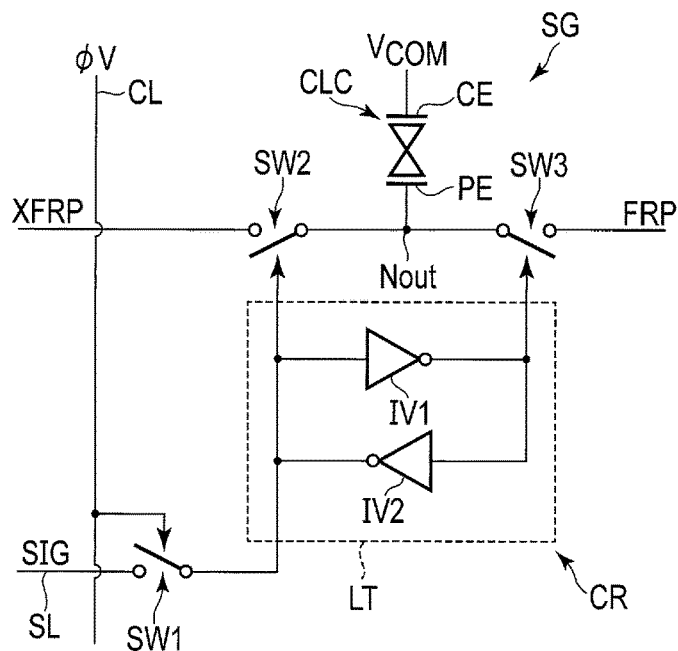
F I G. 2
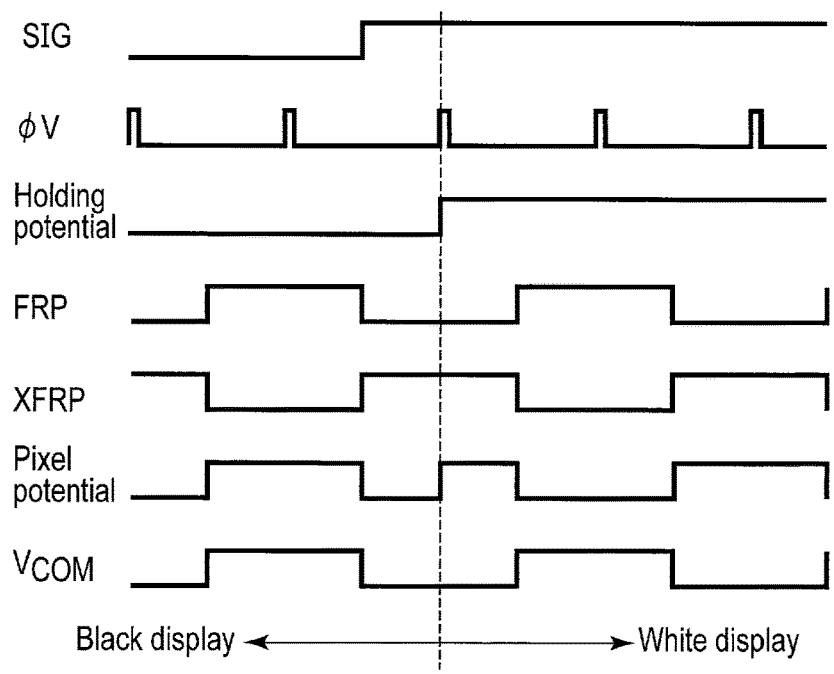
F I G. 3

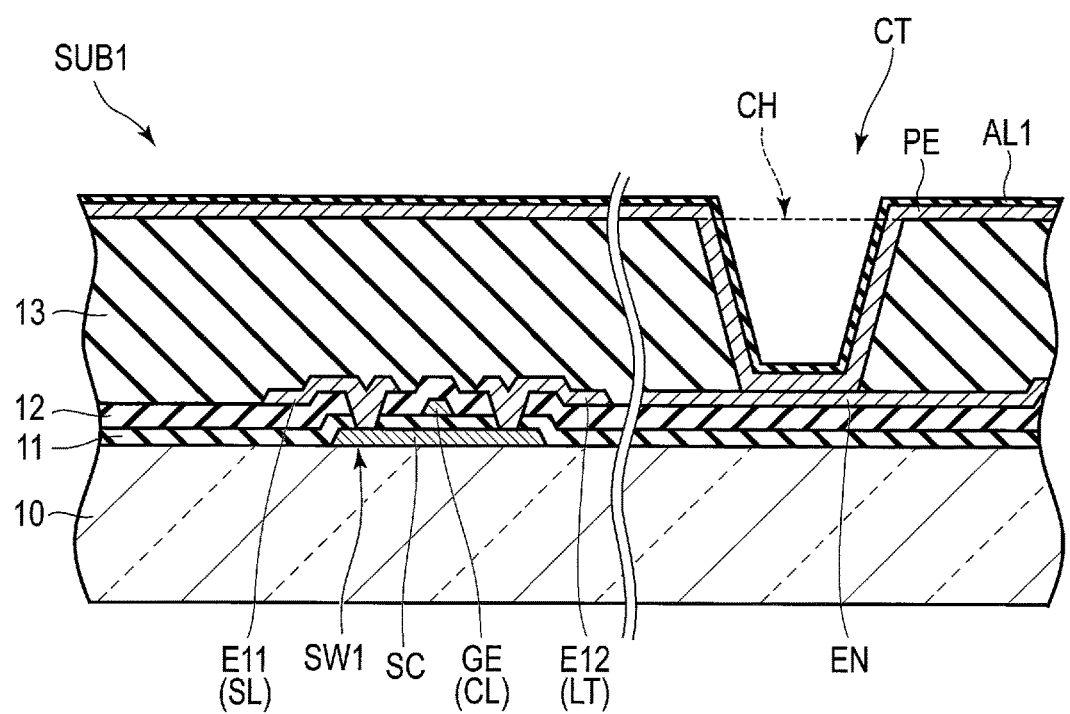
F I G. 5

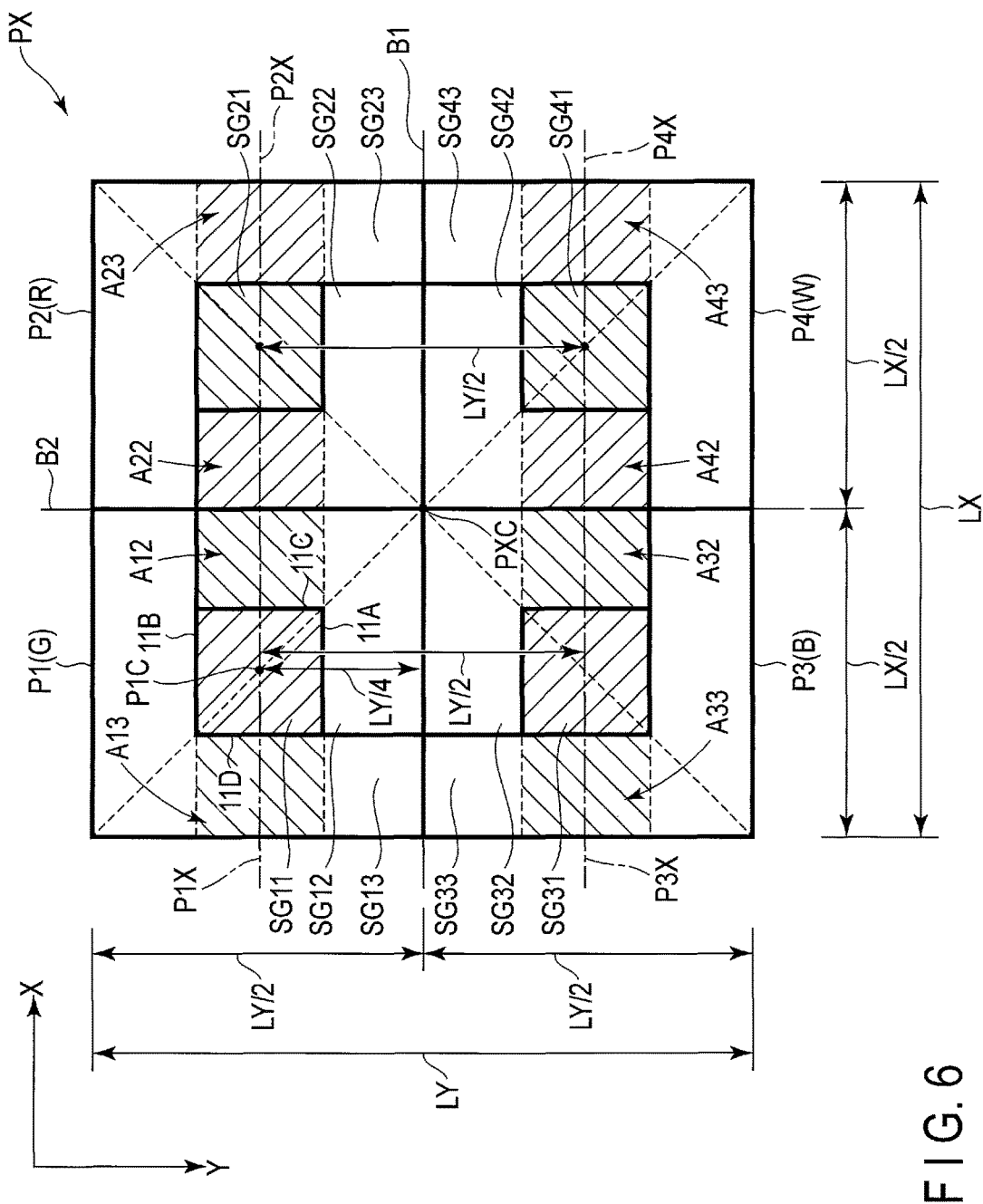
F I G. 6

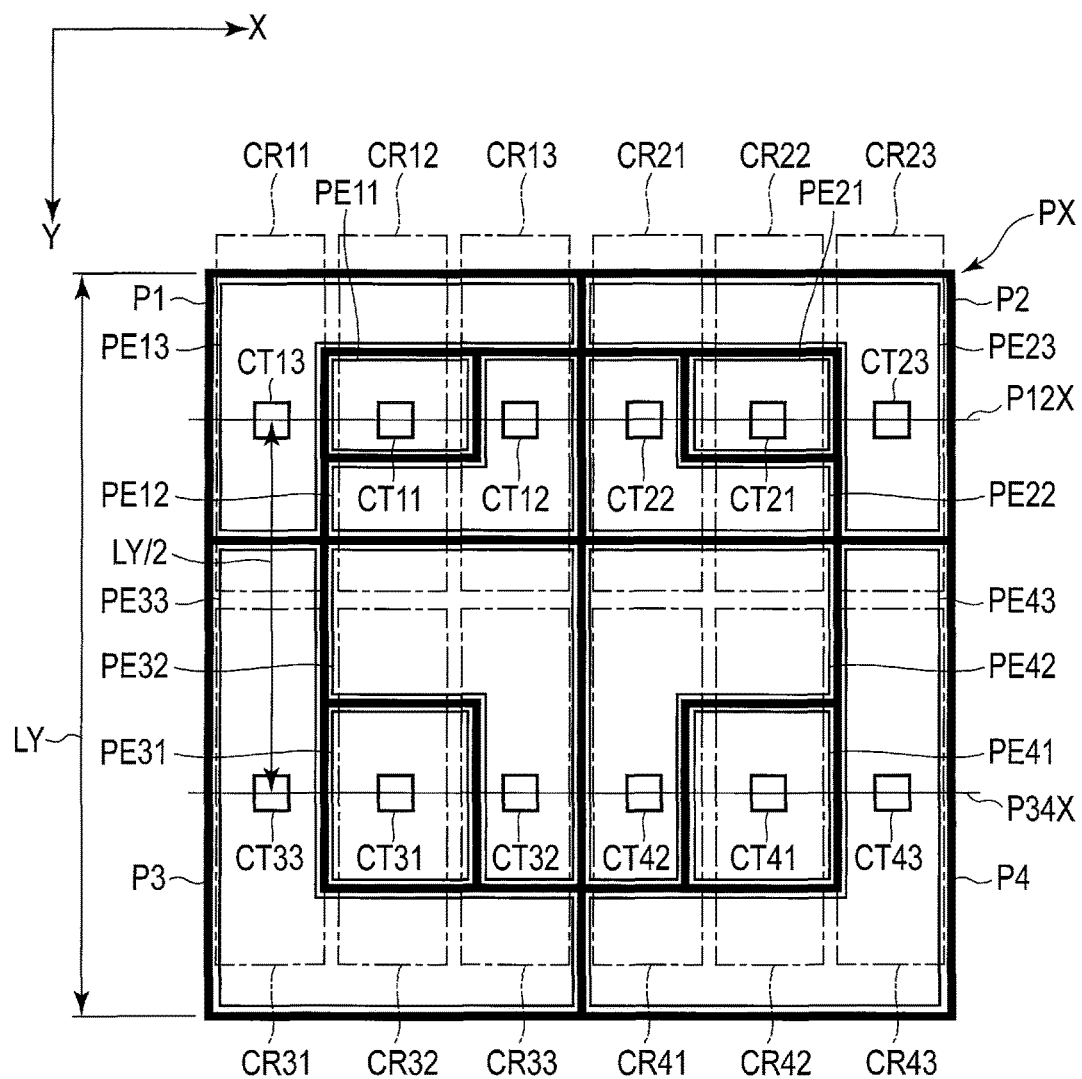
F I G. 13

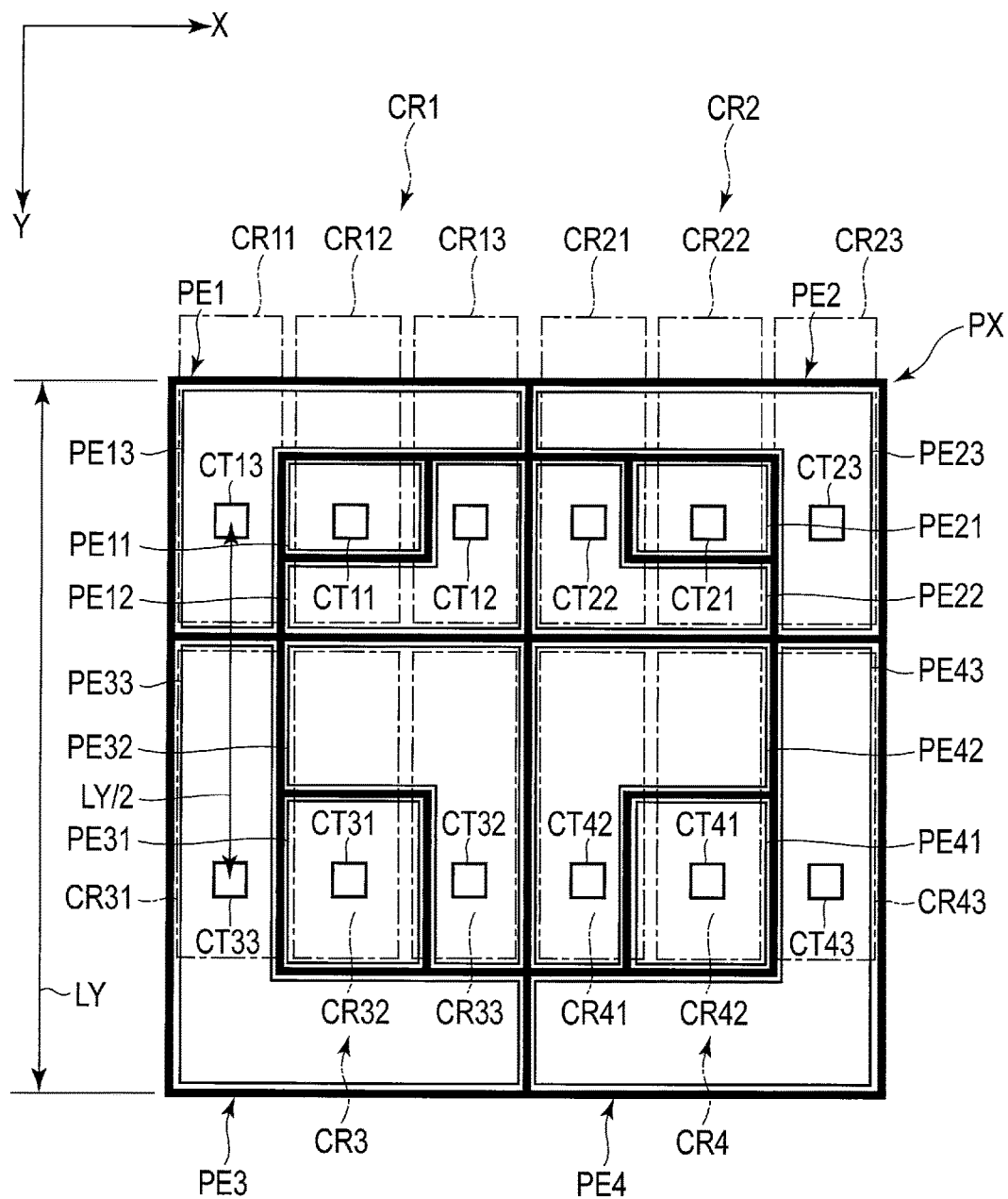
F I G. 19

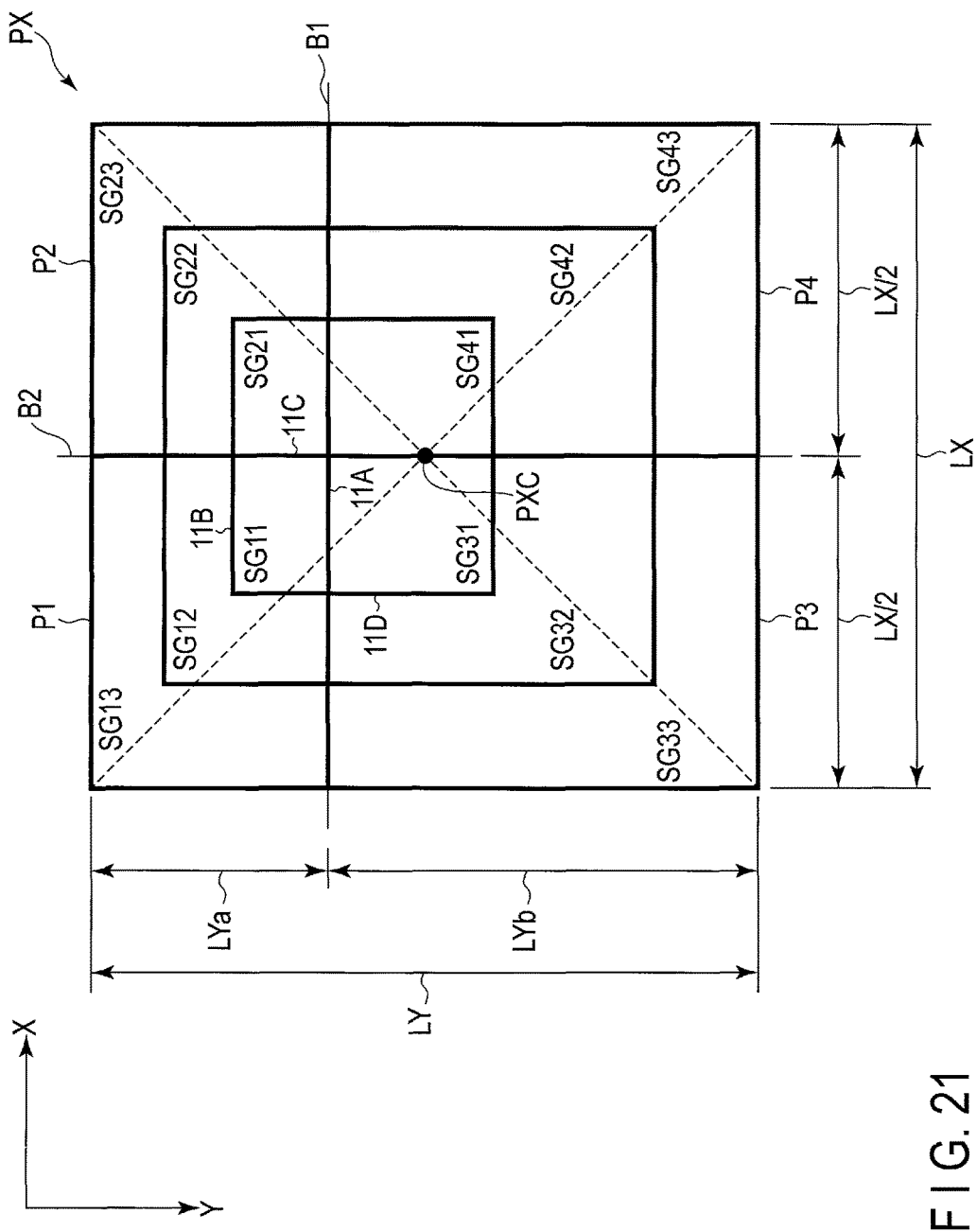
F I G. 21

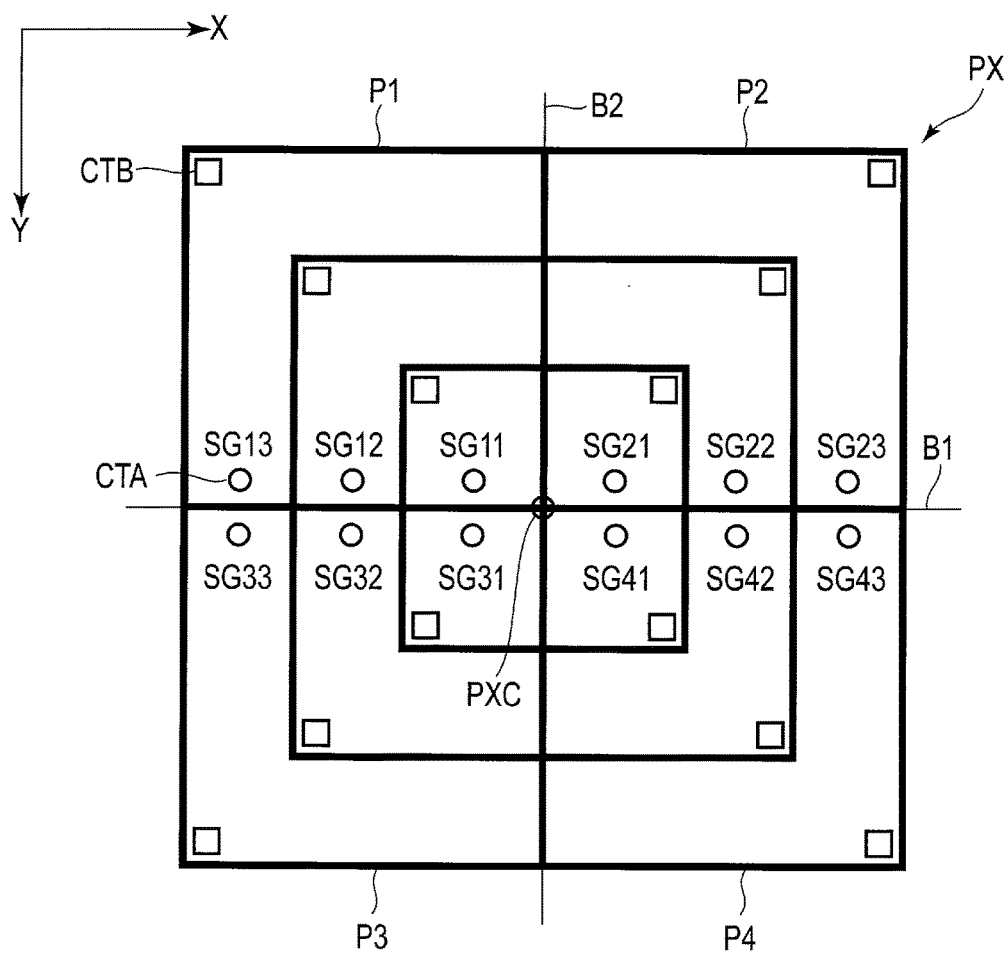
F I G. 22

DISPLAY DEVICE

CROSS-REFERENCE TO RELATED APPLICATIONS

This application is based upon and claims the benefit of priority from Japanese Patent Applications No. 2015-234788, filed Dec. 1, 2015; No. 2015-234789, filed Dec. 1, 2015; No. 2015-234790, filed Dec. 1, 2015; and No. 2016-195668, filed Oct. 3, 2016, the entire contents of all of which are incorporated herein by reference.

FIELD

Embodiments described herein relate generally to a display device.

SUMMARY

The present application generally relates to a display device.

In an embodiment, a display device is provided. The display device includes a unit pixel comprising first to fourth sub-pixels exhibiting different colors, each of the first to fourth sub-pixels comprising first to third segments for displaying 3-bit gradation, the first segment being a rectangular region including first to fourth sides, the second segment being an L-letter region located on a side closer to a geometric center of the unit pixel than the first segment and formed along the first and second sides which intersect each other, the third segment being an L-letter region located on a side farther from the geometric center than the first segment and formed along the third and fourth sides which intersect each other.

Additional features and advantages are described herein, and will be apparent from the following Detailed Description and the figures.

BACKGROUND

Recently, various types of display devices of what is called memory-in-pixel (MIP) system, comprising a memory module capable of storing data in pixels, have been proposed. As a gradation expression system of such a display device, an area gradation (gray scale or tone) method of dividing one pixel into regions (segments) and implementing gradation display by combination of area of these regions is well known.

In the area gradation method, a pixel electrode of a corresponding shape is disposed in each of the divided regions. Area of the pixel electrode (area of a segment) has magnitude responding to the gradation which should express in the segment. However, the shape and arrangement of the segments may be complicated if the number of segments is increased in each unit pixel to implement multi-gradation.

BRIEF DESCRIPTION OF THE DRAWINGS

FIG. 2 is a diagram showing a configuration example of a segment SG shown in FIG. 1.

FIG. 3 is a timing chart for explanation of an operation of the segment SG in the MIP system.

FIG. 5 is a view showing a cross-section of the first substrate SUB1 shown in FIG. 4.

FIG. 6 is an illustration showing a first configuration example of the unit pixel PX.

FIG. 13 is an illustration showing an example of connection between the pixel electrodes PE and the pixel circuits CR in the unit pixel PX of the configuration shown in FIG. 11.

FIG. 19 is an illustration showing another example of connection between the pixel electrodes PE and the pixel circuits CR shown in FIG. 17.

FIG. 21 is an illustration showing a third configuration example of the unit pixel PX.

FIG. 22 is an illustration showing a comparative example of the unit pixel PX.

DETAILED DESCRIPTION

Figure 1:
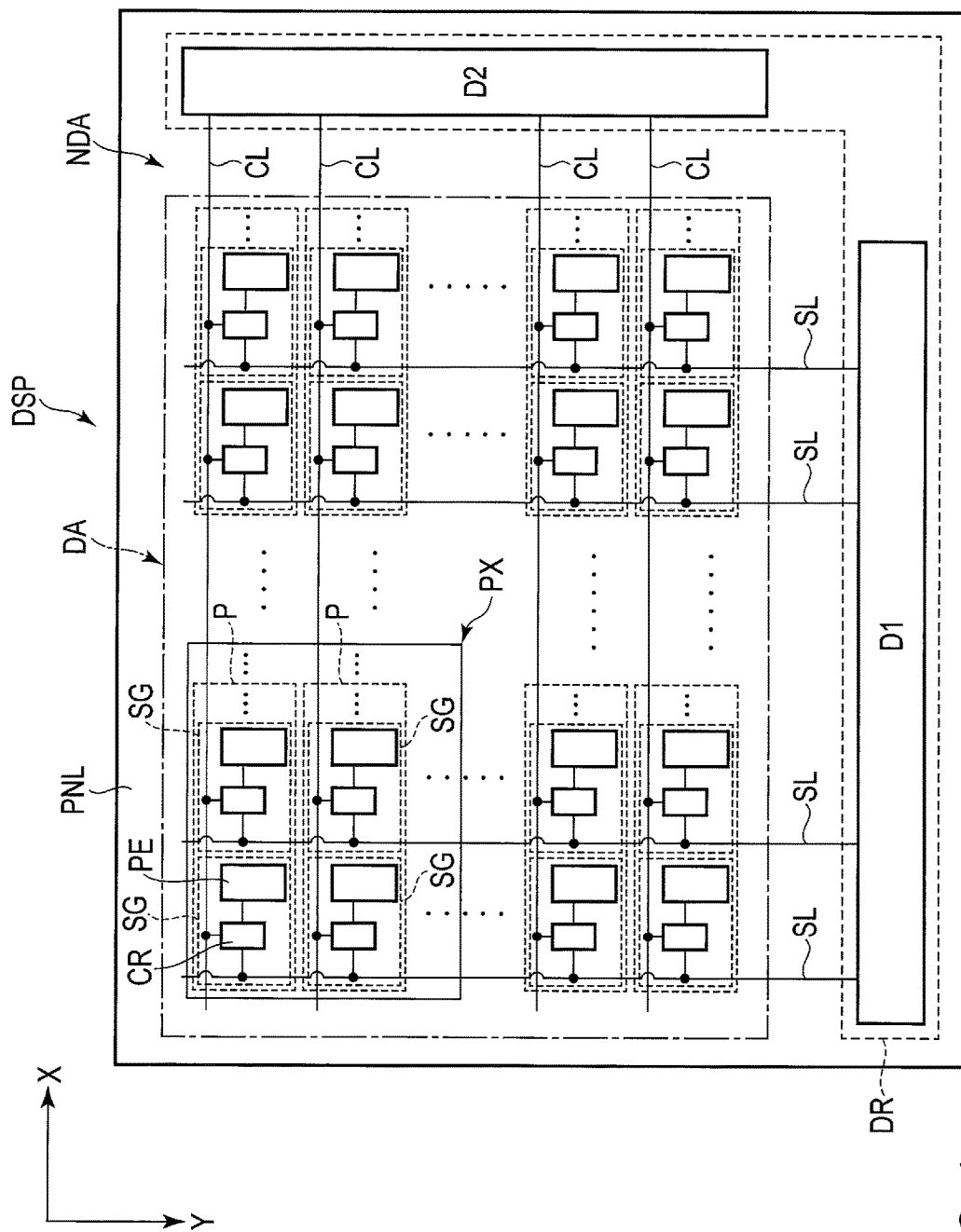
FIG. 1 is a diagram showing a configuration example of a display device DSP.

In general, according to one embodiment, a display device includes: a unit pixel including first to fourth sub-pixels exhibiting different colors, each of the first to fourth sub-pixels including first to third segments for displaying 3-bit gradation, the first segment being a rectangular region including first to fourth sides, the second segment being an L-letter region located on a side closer to a geometric center of the unit pixel than the first segment and formed along the first and second sides which intersect each other, the third segment being an L-letter region located on a side farther from the geometric center than the first segment and formed along the third and fourth sides which intersect each other.

Embodiments will be described hereinafter with reference to the accompanying drawings. The disclosure is a mere example, and arbitrary change of gist which can be easily conceived by a person of ordinary skill in the art naturally falls within the inventive scope. To more clarify the explanations, the drawings may pictorially show width, thickness, shape, etc., of each portion as compared with an actual aspect, but they are mere examples and do not restrict the interpretation of the invention. In each drawing, reference numerals of like or similar elements disposed sequentially may be omitted. In the present specification and drawings, elements like or similar to those in the already described drawings may be denoted by similar reference numbers and their detailed descriptions may be arbitrarily omitted.

In the embodiments, a liquid crystal display device is described as an example of the display device. The display device can be used for, for example, various devices such as a smartphone, a tablet terminal, a mobile telephone terminal, a personal computer, a TV receiver, a vehicle-mounted device, and a game console. The major configuration explained in the present embodiment can also be applied to a self-luminous display device comprising an organic electroluminescent (EL) display element, and the like, an electronic paper display device comprising a cataphoretic element, and the like, a display device employing micro-electro-mechanical systems (MEMS), or a display device employing electrochromism.

FIG. 1 is a diagram showing a configuration example of a display device DSP. In the example illustrated, the display device DSP comprises a display panel PNL, a driving module DR, and the like.

The display panel PNL includes a display area DA on which an image is displayed and a frame-shaped non-display area NDA surrounding the display area DA. The display panel PNL includes signal lines SL, control lines CL, unit pixels PX, lines for transmission of various voltages (not shown), power supply lines and the like, in the display area DA. The signal lines SL are arranged in a first direction X. The control lines CL are arranged in a second direction Y which intersects the first direction X. The unit pixels PX are arrayed in a matrix in an X-Y plane defined by the first direction X and the second direction Y.

The unit pixel PX is a minimum unit which constitutes a color image. The unit pixel PX is composed of sub-pixels P as described later. For example, one unit pixel PX comprises a sub-pixel exhibiting a red color, a sub-pixel exhibiting a green color, and a sub-pixel exhibiting a blue color as the sub-pixels P. The unit pixel PX may comprise not only the sub-pixels of these three colors, but also a sub-pixel exhibiting the other color such as a white color. Each sub-pixel P is composed of segments (hereinafter often simply called pixels) SG. Each segment SG comprises a pixel circuit CR connected to the control line CL and the signal line SL, and a pixel electrode PE connected to the pixel circuit CR. The pixel electrode PE has substantially the same shape as the segment SG. In other words, area of the segment SG indicates installation area of the pixel electrode PE in planar view of the pixel. The segment SG or region where the pixel electrode PE is disposed corresponds to the region contributing to the display.

The display panel PNL is, for example, a reflective display panel having a reflective display function of displaying an image by selectively reflecting light incident from the display surface side, such as external light and auxiliary light, by the pixel electrode PE of each of the segments SG. The display panel PNL may be a transmissive display panel having a transmissive display function of displaying an image by selectively transmitting the light from a backlight unit disposed independently, by the pixel electrode PE of each of the segments SG. The display panel PNL may be a transflective display panel having the transmissive display function and the reflective display function.

The driving module DR comprises a signal line driving module D1 and a control line driving module D2. The driving module DR may be formed in the non-display area NDA of the display panel PNL, built in an IC chip mounted on the display panel PNL, or formed in a flexible printed circuit connected to the display panel PNL.

Each of the signal lines SL is connected to the signal line driving module D1. The signal line driving module D1 outputs, for example, a signal potential corresponding to predetermined gradation to the corresponding signal line SL. Each of the control lines CL is connected to the control line driving module D2. The control line driving module D2 outputs a control signal to control an operation of writing the signal potential to the segment SG, to the corresponding control line CL. The driving module DR may further comprise a driving timing generating circuit, a power supply circuit and the like.

FIG. 2 is a diagram showing a configuration example of the segment SG shown in FIG. 1. In the embodiment, the segment SG has a configuration employing what is called memory-in-pixel (MIP) system, which comprises a memory module capable of storing data such as the pixel signal in the pixels. This configuration can store binary data (logic 1/logic 0) in a memory module in the pixel and implement on and off states of the segment SG, based on the binary data. In addition, area forms one sub-pixel P by the same or different segments SG, and area in the on state is varied in accordance with combination of on and off states of the segments SG. The gradation display in each sub-pixel is thus implemented in accordance with the difference in area of the segments in the on state. The gradation expression method is also called an area gradation method. The area gradation method is, for example, a gradation expression method of expressing $2^n$ gradations by N segments SG obtained by weighting the area proportion of the pixel electrode as $2^0, 2^1, 2^2, \ldots, 2^{n-1}$. It should be noted that area of the segment SG as explained in the embodiment corresponds to area of the pixel electrode PE disposed in each segment SG. In other words, area of the segment SG can be restated as area of the pixel electrode PE.

In the memory display mode, an operation of writing the signal potential on which the gradation is reflected does not need to be performed in a frame cycle since data stored in the memory module is used. For this reason, power consumption at the display device can be reduced in the memory display mode.

In addition, there are needs for partially rewriting the display screen displayed in the display area DA. In this case, the signal potential of the pixel needs only to be partially rewritten. In other words, the data is transferred to the pixel which needs to be rewritten while the data does not need to be transferred to the pixel which does not need to be rewritten. The mode therefore has another advantage that the power consumption at the display device can be further reduced since the data transfer amount can be reduced.

The segment SG includes a liquid crystal capacitance CLC and a pixel circuit CR as illustrated. The liquid crystal capacitance CLC indicates a capacitance component of the liquid crystal layer LC which is generated between a pixel electrode PE and a common electrode CE. The pixel electrode PE is disposed in each segment SG and electrically connected with the pixel circuit CR. The common electrode CE is opposed to pixel electrodes PE. A common voltage Vcom is applied to the common electrode CE.

The pixel circuit CR comprises three switches SW1 to SW3 and a latch module LT.

The switch SW1 is composed of, for example, an Nch-MOS transistor. The switch SW1 has an end connected to the signal line SL and the other end connected to the latch module LT. The switch SW1 is controlled to be on or off by the control signal supplied via the control line CL. In other words, the switch SW1 becomes on (closed) by being supplied with a control signal ϕV from the control line driving module D2 in FIG. 1 via the control line CL to take in data (signal potential corresponding to the gradation) SIG supplied from the signal line driving module in FIG. 1 via the signal line SL.

The latch LT comprises inverters IV1 and IV2 parallel-connected in directions opposite to each other. Each of the inverters IV1 and IV2 is composed of, for example, a CMOS inverter. The latch module LT constitutes the memory module to hold (latch) the electric potential corresponding to the data SIG taken in by the switch SW1.

Each of the switches SW2 and SW3 is composed of, for example, a transfer formed by connecting an NchMOS transistor and a PchMOS transistor parallel to each other but can be composed of a transistor of the other configuration. An end of the switch SW2 is supplied with a voltage XFRP of a phase opposite to the common voltage Vcom. An end of the switch SW3 is supplied with a voltage FRP in phase with the common voltage Vcom. The other ends of the switches SW2 and SW3 are connected to each other and electrically connected to the pixel electrode PE to form an output node Nout of the pixel circuit CR. Either of the switches SW2 and SW3 becomes on state in accordance with polarity of the holding potential of the latch module LT. The in-phase voltage FRP or the opposite-phase voltage XFRP is thereby applied to the pixel electrode PE of the liquid crystal capacitance CLC in which the common voltage Vcom is applied to the common electrode CE.

FIG. 3 is a timing chart for explanation of an operation of the segment SG in the MIP system. A normally black mode of exhibiting a black color in a state in which no voltage is applied to the liquid crystal layer LC will be explained here.

In the pixel circuit CR, the data SIG supplied to the signal line SL is received and the electric potential corresponding to the received data SIG is held by the latch module LT, at timing at which the control signal ϕV is supplied to the switch SW1. When the data SIG corresponding to logic 0 is received, the holding potential of the latch module LT has negative polarity. In this case, the switch SW2 becomes off (opened) state, the switch SW3 becomes on (closed) state, and the voltage FRP in phase with the common voltage Vcom is applied to the pixel electrode PE. The pixel potential of the pixel electrode PE is thereby made equivalent to that of the common voltage Vcom of the common electrode. For this reason, the voltage is not applied to the liquid crystal layer LC and the segment SG exhibits a black color.

In contrast, when the data SIG corresponding to logic 1 is received in the pixel circuit CR, the holding potential of the latch module LT has a positive polarity. In this case, the switch SW3 becomes off (opened) state, the switch SW2 becomes on (closed) state, and the voltage XFRP in opposite phase with the common voltage Vcom is applied to the pixel electrode PE. A potential difference is thereby made between the pixel potential of the pixel electrode PE and that of the common voltage Vcom of the common electrode. In other words, the voltage is applied to the liquid crystal layer LC. For this reason, the segment SG exhibits a white color since the light transmitted through the liquid crystal layer LC is modulated and partially contributes to the display.

For example, the state in which the segment SG exhibits a black color corresponds to the off state of the segment SG, and the state in which the segment SG exhibits a white color corresponds to the on state of the segment SG.

Thus, in the configuration of the MIP system, the in-phase voltage FRP or the opposite-phase voltage XFRP is applied to the pixel electrode PE, since either of the switches SW2 and SW3 becomes on state in response to the polarity of the holding potential of the latch module LT. In other words, the pixel circuit CR supplies either of the signal potentials corresponding to binary gradations to the pixel electrode PE. Since a constant voltage is thereby applied to the segments SG at any time, shading can be suppressed.

In the above-described example, a static random access memory (SRAM) is used as a memory built in the segments SG, but is not limited to this and may employ the other configuration such as a dynamic random access memory (DRAM).

Next, a configuration example of the reflective display panel PNL will be explained.

Figure 4:
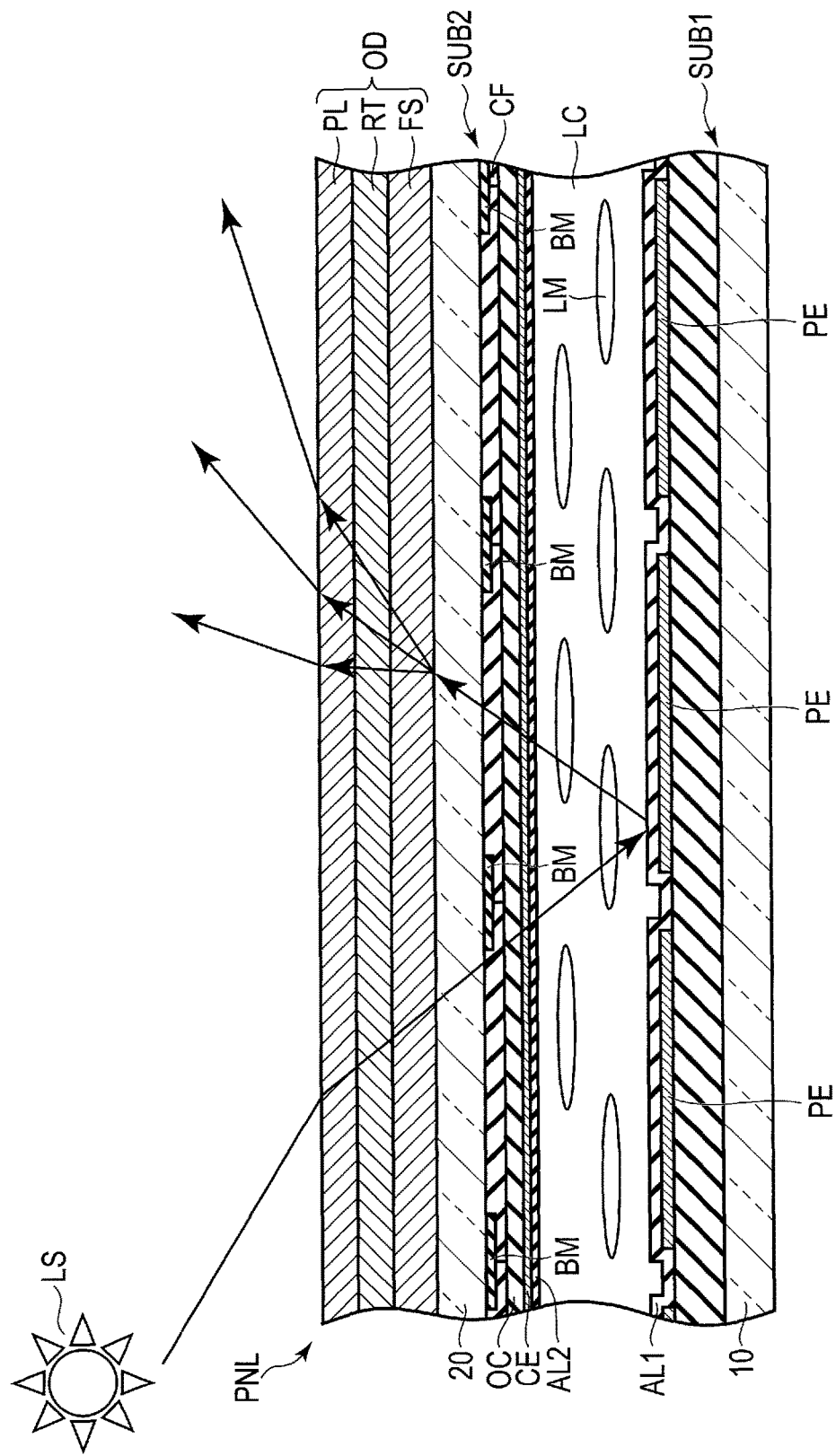
FIG. 4 is a view showing a cross-section of the display panel PNL. Constituent elements necessary for explanations alone are shown in the drawing.

FIG. 4 is a view showing a cross-section of the display panel PNL. Constituent elements necessary for explanations alone are shown in the drawing.

The display panel PNL includes a first substrate SUB1, a second substrate SUB2, a liquid crystal layer LC and an optical element OD.

The first substrate SUB1 includes a first insulating substrate 10, pixel electrodes PE, a first alignment film AL1 and the like. The first substrate SUB1 includes the pixel circuit CR and the like besides various lines such as the control lines CL and the signal lines SL shown in FIG. 1, though not illustrated in the drawings. The pixel electrodes PE are located on a side of the first insulating substrate 10, which is opposed to the second substrate SUB2. Each of the pixel electrodes PE corresponds to a reflecting electrode and includes a reflective layer formed of, for example, a metal material such as aluminum or silver which has a light reflection property. The first alignment film AL1 covers the pixel electrodes PE.

The second substrate SUB2 includes a second insulating substrate 20, a light-shielding layer BM, a color filter layer CF, an overcoat layer OC, the common electrode CE, a second alignment film AL2 and the like. The light-shielding layer BM is located on a side of the second insulating substrate 20, which is opposed to the first substrate SUB1. In the example illustrated, the light shielding layer BM is opposed to a gap between adjacent pixel electrodes PE. The color filter layer CF is located on a side of the second insulating substrate 20, which is opposed to the first substrate SUB1, and partially overlaid on the light shielding layer BM. The color filter layer CF includes a red color filter, a green color filter and a blue color filter, though not described in detail. The red color filter is disposed in a sub-pixel exhibiting a red color. The green color filter is disposed in a sub-pixel exhibiting a green color. The blue color filter is disposed in a sub-pixel exhibiting a blue color. The color filter layer CF may further include a color filter of the other color such as a white color or a transparent layer. The overcoat layer OC covers the color filter layer CF. The common electrode CE is located on a side of the overcoat layer OC, which is opposed to the first substrate SUB1. The common electrode CE is opposed to pixel electrodes PE. The common electrode CE is formed of a transparent, electrically conductive material such as indium tin oxide (ITO) or indium zinc oxide (IZO). The second alignment film AL2 covers the common electrode CE.

A configuration of depositing color filters of different colors at a boundary of the sub-pixels exhibiting different colors can be employed in the second substrate SUB2. Since the transmittance of the boundary portion can be thereby reduced, the light-shielding layer BM does not need to be disposed. The color filter layer CF is not disposed in the display panel PNL of a monochromatic display type.

The liquid crystal layer LC is held between the first substrate SUB1 and the second substrate SUB2, and includes liquid crystal molecules LM located between the first alignment film AL1 and the second alignment film AL2.

The optical element OD is located on the side opposite to the surface of the second substrate SUB2, which is opposed to the liquid crystal layer LC. The optical element OD comprises, for example, a diffusion layer FS, a retardation film RT, a polarizer PL and the like. The diffusion layer FS is bonded to the second insulating substrate 20, the retardation film RT is deposited on the diffusion layer FS, and the polarizer PL is deposited on the retardation film RT. It should be noted that the configuration of the optical element OD is not limited to the example illustrated.

The diffusion layer FS is an anisotropic scattering layer which scatters the light incident from a specific direction. In the example illustrated, the diffusion layer FS has a function of allowing the light incident from a light source LS side in the drawing to be transmitted without substantially scattering, and scattering the reflected light in a specific direction, i.e., at the pixel electrodes PE. The diffusion layers FS are desirably stacked for purposes such as extension of the range of diffusion, prevention of rainbow hues and the like. The retardation film RT has a function of a quarter-wave plate. For example, the retardation film RT is a stacked body in which a quarter-wave plate and a half-wave plate are stacked, and is configured to reduce a wavelength dependency and obtain a desired phase difference within a wavelength range used for color display.

In the display panel PNL, the side close to the light source LS corresponds to the display surface side. In the example illustrated, the surface of the optical element OD corresponds to the display surface but, if the cover member is disposed on the surface of the optical element OD, the surface of the cover member corresponds to the display surface.

If the segment is on, the light incident on the display panel PNL from the light source LS is reflected on the pixel electrode PE to pass through the liquid crystal layer LC, and is transmitted through the optical element OD. For this reason, a white color or the color of the color filter layer CF is exhibited in the on state. In contrast, if the segment is off, the light incident on the display panel PNL from the light source LS is reflected on the pixel electrode PE to pass through the liquid crystal layer LC, and is absorbed by the optical element OD. For this reason, black is exhibited in the off state.

FIG. 5 is a view showing a cross-section of the first substrate SUB1 shown in FIG. 4. The drawing shows a cross-section of the switch SW1 shown in FIG. 2, a node electrode EN serving as the output node Nout, and the pixel electrode PE.

The switch SW1 comprises a semiconductor layer SC, a gate electrode GE, and a first electrode E11 and a second electrode E12 corresponding to the source and the drain. The semiconductor layer SC is located on the first insulating substrate 10 and covered with the first insulating film 11. The gate electrode GE is located on the first insulating film 11 and covered with the second insulating film 12. Each of the first electrode E11 and the second electrode E12 is located on the second insulating film 12, brought into contact with the semiconductor layer SC and covered with the third insulating film 13. The gate electrode GE, the first electrode E11 and the second electrode E12 are electrically connected to the control line CL, the signal line SL and the latch module LT shown in FIG. 2, respectively.

The node electrode EN is an electrode connected to the other end of each of the switches SW2 and SW3 shown in FIG. 2. The node electrode EN is located on the second insulating film 12 and covered with the third insulating film 13.

The pixel electrode PE is located on the third insulating film 13 and covered with the first alignment film AL1. The pixel electrode PE is in contact with the node electrode EN through a contact hole CH which penetrates the third insulating film 13.

The first insulating film 11 and the second insulating film 12 are formed of an inorganic material such as silicon nitride or silicon oxide. The third insulating film 13 is formed of an organic material such as resin. It should be noted that the pixel electrode CR comprising the switch SW1 and the node electrode EN are located between the first insulating substrate 10 and the third insulating film 13. In the embodiment, the third insulating film 13 corresponds to a single-layer organic insulating film located between the pixel circuit CR and the pixel electrode PE. In other words, the pixel electrode PE is directly connected to the node electrode EN without interposition of a relay electrode in the other layer. For this reason, the manufacturing process can be simplified. In the embodiment, a portion at which the pixel electrode PE and the node electrode EN are connected to each other is called a connection portion CT.

Next, a configuration example of the unit pixel PX applicable to the embodiment will be described.

«First Configuration Example»

FIG. 6 is an illustration showing a first configuration example of the unit pixel PX. The unit pixel PX includes four sub-pixels P1 to P4. The sub-pixels P1 and P2 are arranged side by side in the first direction X. The sub-pixels P3 and P4 are arranged side by side in the first direction X. The sub-pixels P1 and P3 are arranged side by side in the second direction Y. The sub-pixels P2 and P4 are arranged side by side in the second direction Y. The sub-pixels P1 to P4 exhibit different colors. For example, the sub-pixel P1 exhibits a green color (G), the sub-pixel P2 exhibits a red color (R), the sub-pixel P3 exhibits a blue color (B), and the sub-pixel P4 exhibits a white color (W). The color display is implemented by arranging the color filters of the colors corresponding to the respective sub-pixels P1 to P4 so as to be opposed to the pixel electrodes PE in the respective sub-pixels P1 to P4 as explained with reference to FIG. 4. In the self-luminous display device, the color display is implemented by disposing light-emitting elements emitting the corresponding colors in the respective sub-pixels P1 to P4.

The unit pixel PX has a length LX in the first direction X and a length LY in the second direction Y. For example, the unit pixel PX is configured to be in a square shape having the equal length LX and length LY. In the example illustrated, each of the sub-pixels P1 to P4 has a length LX/2 in the first direction X and a length LY/2 in the second direction Y. The length LX/2 is equal to the length LY/2. Each of the sub-pixels P1 to P4 is configured to be in a square shape. In addition, the sub-pixels P1 to P4 have equal areas. In the unit pixel PX, a straight line extending in the first direction X is referred to as a boundary B1 while a straight line extending in the second direction Y is referred to as a boundary B2. The boundary B1 is located between the sub-pixel P1 and the sub-pixel P3 and between the sub-pixel P2 and the sub-pixel P4. The boundary B2 is located between the sub-pixel P1 and the sub-pixel P2 and between the sub-pixel P3 and the sub-pixel P4. A geometric center PXC of the unit pixel PX is defined as a point of intersection of the boundaries B1 and B2. In addition, the geometric center PXC of the unit pixel PX can also be defined as a point of intersection of two diagonal lines (dotted lines in the drawing) of a rectangle (square in the example illustrated) defined as an outer periphery of the unit pixel PX, from a different point of view.

In the unit pixel PX, the sub-pixels P1 to P4 are configured similarly. In the example illustrated, the sub-pixels P1 and P2 are configured to have line symmetry of the sub-pixels P3 and P4 with respect to the boundary B1. Similarly to this, the sub-pixels P1 and P3 are configured to have line symmetry of the sub-pixels P2 and P4 with respect to the boundary B2. The sub-pixels P1 and P4 are configured to have point symmetry with respect to the geometric center PXC. Similarly to this, the sub-pixels P2 and P3 are configured to have point symmetry with respect to the geometric center PXC. The configuration of each sub-pixel will be described hereinafter in detail. The sub-pixel P1 will be explained as an example and detailed descriptions of the other sub-pixels are omitted.

In other words, the sub-pixel P1 includes three segments SG11 to SG13 to display 3-bit gradation.

The segment SG11 corresponds to a rectangular region located at a central portion of the sub-pixel P1. In the example illustrated, the segment SG11 is configured to be in a square shape. The central portion is a region including a middle point of the length LY/2 of the sub-pixel P1 in the second direction Y or a position P1C remote from the boundary B1 at a distance of LY/4 in the second direction Y. The segment SG11 includes a pair of sides 11A and 11B in the first direction X and a pair of sides 11C and 11D in the second direction Y.

The segment SG12 is located on a side closer to the geometric center PXC than the segment SG11. The segment SG12 corresponds to an L-letter region formed along the sides 11A and 11C. An area of the segment SG12 is larger than an area of the segment SG11. The segment SG12 includes a sub-area A12 along the side 11C. The segment SG12 is adjacent to the sub-pixel P3 across the boundary B1 and adjacent to the sub-pixel P2 across the boundary B2.

A rectangular region of the segments SG11 and SG12 is similar to the rectangular region of the segment SG11.

The segment SG13 is located on a side farther from the geometric center PXC than the segment SG11. The segment SG13 corresponds to an L-letter region formed along the sides 11B and 11D. In addition, the segment SG13 extends in the first direction X across the side 11B and is adjacent to a part of the segment SG12. Furthermore, the segment SG13 extends in the second direction Y across the side 11D and is adjacent to a part of the segment SG12. An area of the segment SG13 is larger than an area of the segment SG12. The segment SG13 includes a sub-area A13 along the side 11D. The segment SG11 is surrounded by the segments SG12 and SG13.

A rectangular region of the segments SG11, SG12 and SG13 is similar to the rectangular region of the segment SG11.

At the central portion of the sub-pixel P1, three segments SG11 to SG13 are arranged in the first direction X with the segment SG11 located at the center. In the example illustrated, the sub-area A13, the segment SG11, and the sub-area A12 are arranged in this order in the first direction X.

An area ratio of the segments SG11, SG12 and SG13 is, for example, 1:2:4 ($=2^0:2^1:2^2$). The area ratio of the embodiment is based on an area of the region substantially contributing to the display in each segment, and does not include an area of a region overlaid on the connection portion CT or the light-shielding layer BM which does not contribute to the display. Alternatively, a configuration of setting the area ratio of the segments SG11, SG12 and SG13 including the connection portion to 1:2:4 can also be employed. Combination of the area ratio of the segments SG11 to SG13 is not limited to the above example.

The segment SG11 is a display area corresponding to the least significant bit (for example, $2^0$) in the 3-bit area gradation. The segment SG13 is a display area corresponding to the most significant bit (for example, $2^2$) in the 3-bit area gradation. The segment SG12 is a display area corresponding to the middle bit (for example, $2^1$) in the 3-bit area gradation. The 3-bit area gradation display can be implemented by combination the segments SG11 to SG13.

Similarly to this, the sub-pixel P2 includes the segments SG21 to SG23, the sub-pixel P3 includes the segments SG31 to SG33, and the sub-pixel P4 includes the segments SG41 to SG43. The segments SG12, SG22, SG32 and SG42 are located most closely to the geometric center PXC. The segment SG12 is adjacent to the segment SG22 across the boundary B2 and adjacent to the segment SG32 across the boundary B1. The segment SG42 is adjacent to the segment SG32 across the boundary B2 and adjacent to the segment SG22 across the boundary B1. The segments SG13, SG23, SG33 and SG43 are located farthest from the geometric center PXC. The segment SG13 is adjacent to the segment SG23 across the boundary B2 and adjacent to the segment SG33 across the boundary B1. The segment SG43 is adjacent to the segment SG33 across the boundary B2 and adjacent to the segment SG23 across the boundary B1. The segment SG11 is adjacent to the segment SG21 across the segments SG12 and SG22, and adjacent to the segment SG31 across the segments SG12 and SG32. The segment SG41 is adjacent to the segment SG31 across the segments SG32 and SG42, and adjacent to the segment SG21 across the segments SG42 and SG22.

A positional relationship of twelve segments forming the unit pixel PX will be explained below from the other point of view. When attention is focused on the sub-pixels P1 and P2 arranged in the first direction X, three segments SG11 to SG13 of the sub-pixel P1 are disposed to have line symmetry of three segments SG21 to SG23 of the sub-pixel P2 with respect to the boundary B2. When attention is focused on the sub-pixels P1 and P3 arranged in the second direction Y, three segments SG11 to SG13 of the sub-pixel P1 are disposed to have line symmetry of three segments SG31 to SG33 of the sub-pixel P3 with respect to the boundary B1. When attention is focused on the sub-pixels P1 and P4, three segments SG11 to SG13 of the sub-pixel P1 are disposed to have point symmetry of three segments SG41 to SG43 of the sub-pixel P4 with respect to the geometric center PXC.

In the sub-pixel P2, the segments SG22 and SG23 include sub-areas A22 and A23, respectively. In the sub-pixel P3, the segments SG32 and SG33 include sub-areas A32 and A33, respectively. In the sub-pixel P4, the segments SG42 and SG43 include sub-areas A42 and A43, respectively.

At the central portion of the sub-pixel P2, three segments SG21 to SG23 are arranged in the first direction X with the segment SG21 located at the center. In the example illustrated, the sub-area A22, the segment SG21, and the sub-area A23 are arranged in this order in the first direction X. In addition, the sub-area A22, the segment SG21, and the sub-area A23 are located in the same straight line as the sub-area A13, the segment SG11, and the sub-area A12.

At the central portion of the sub-pixel P3, three segments SG31 to SG33 are arranged in the first direction X with the segment SG31 located at the center. In the example illustrated, the sub-area A33, the segment SG31, and the sub-area A32 are arranged in this order in the first direction X.

At the central portion of the sub-pixel P4, three segments SG41 to SG43 are arranged in the first direction X with the segment SG41 located at the center. In the example illustrated, the sub-area A42, the segment SG41, and the sub-area A43 are arranged in this order in the first direction X. In addition, the sub-area A42, the segment SG41, and the sub-area A43 are located in the same straight line as the sub-area A33, the segment SG31, and the sub-area A32.

A center line of the region in which three segments SG11 to SG13 of the sub-pixel P1 are arranged in the first direction X is denoted by P1X. A center line of the region in which three segments SG31 to SG33 of the sub-pixel P3 are arranged in the first direction X is denoted by P3X. An interval between the center lines P1X and P3X in the second direction Y is approximately a half of a length LY of the unit pixel PX. Similarly to this, a center line of the region in which three segments SG21 to SG23 of the sub-pixel P2 are arranged in the first direction X is denoted by P2X. A center line of the region in which three segments SG41 to SG43 of the sub-pixel P4 are arranged in the first direction X is denoted by P4X. An interval between the center lines P2X and P4X in the second direction Y is approximately a half of a length LY of the unit pixel PX. The center lines P1X and P2X are located on the same straight line while the center lines P3X and P4X are located on the same straight line.

As described later, each of the segments SG11 to SG13 includes a pixel electrode of the corresponding shape and the pixel electrodes in each of the segments are remote from each other. Each of the sub-pixels is sectioned by the light-shielding layer, and the light-shielding layer is also disposed at each boundary of the segments. In other words, solid lines shown in the drawing correspond to the intervals between adjacent pixel electrodes and also correspond to the regions in which the light-shielding layer is disposed.

The first configuration example of the unit pixel PX has been described above, and a relationship in area among the regions will be explained in brief. The area of the sub-pixel P1 corresponds to a total area of three segments SG11 to SG13. Similarly to this, the area of the sub-pixel P2 corresponds to a total area of three segments SG21 to SG23, the area of the sub-pixel P3 corresponds to a total area of three segments SG31 to SG33, and the area of the sub-pixel P4 corresponds to a total area of three segments SG41 to SG43. The area of the unit pixel PX corresponds to the total area of four sub-pixels P1 to P4. In other words, the area of the unit pixel PX is approximately equal to the total area of twelve segments, i.e., segments SG11 to SG13, segments SG21 to SG23, and segments SG41 to SG43.

Figure 7:
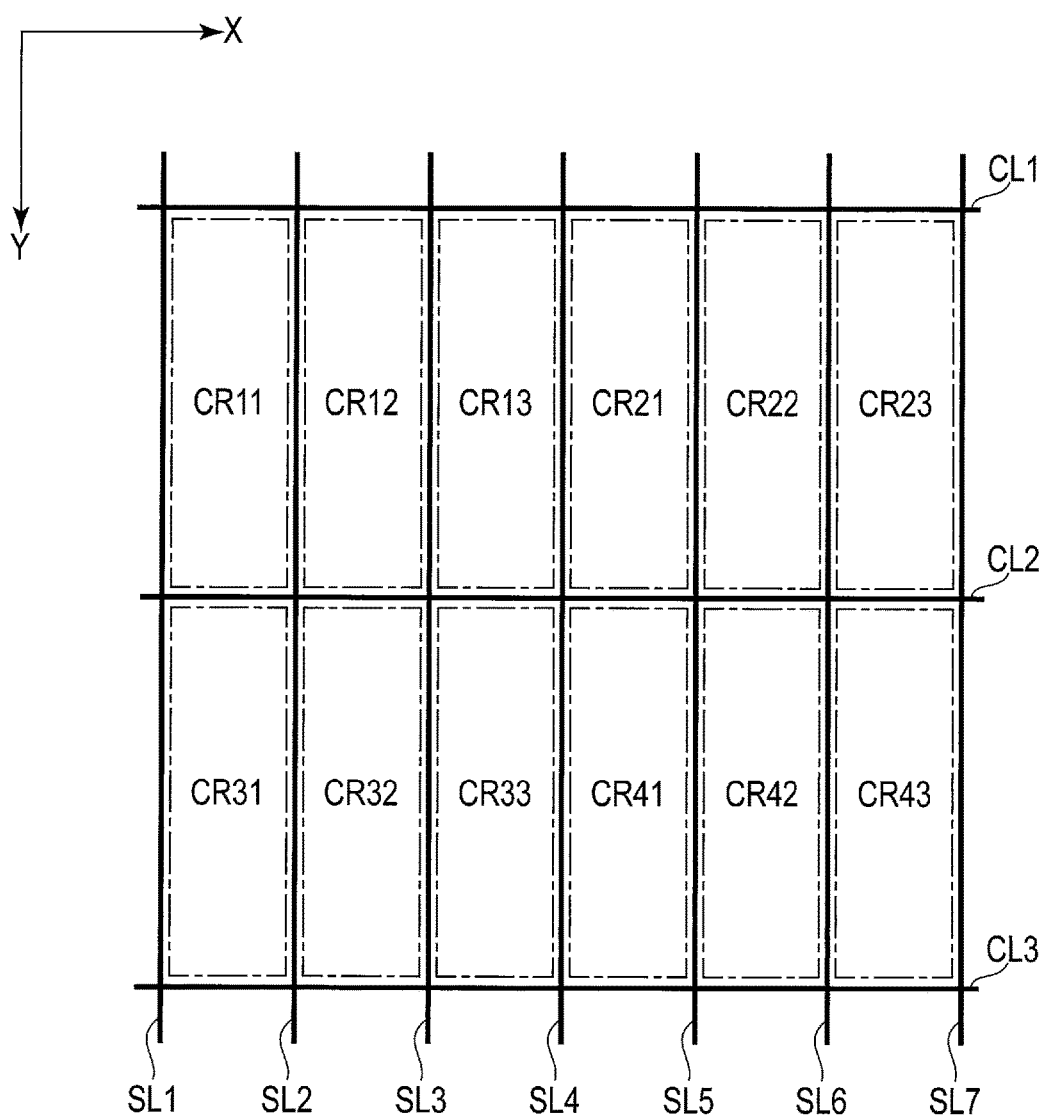
FIG. 7 is an illustration showing an example of a layout of the pixel circuits CR corresponding to the respective segments shown in FIG. 6.

FIG. 7 is an illustration showing an example of a layout of the pixel circuits CR corresponding to the respective segments shown in FIG. 6. The pixel circuits CR are formed in the areas represented by one-dot-chained lines in the drawing and their specific configurations are not illustrated, but they may have any configurations if the equivalent circuit shown in FIG. 2 can be implemented. The pixel circuits illustrated in the drawing are configured in the same layout. For example, each of the pixel circuits is formed in the region sectioned by two adjacent signal lines and two adjacent control lines but is not limited to this example, and may be sectioned by the other lines such as a line for supply of the voltage FRP or the voltage XFRP.

In the example illustrated, the signal lines SL1 to SL7 are spaced apart and arranged in first direction X, and the control lines CL1 to CL3 are spaced apart and arranged in the second direction Y. The pixel circuits CR11 to CR13 and CR21 to CR23 are arranged in the first direction X. The pixel circuits CR31 to CR33 and CR41 to CR43 are arranged in the first direction X. Each of the pixel circuits CR11 to CR13, CR21 to CR23, CR31 to CR33, and CR41 to CR43 is formed in the region in which the length in the first direction X is smaller than the length in the second direction Y. The pixel circuits CR11 to CR13, and the pixel circuits CR31 to CR33 are arranged in the second direction Y. The pixel circuits CR21 to CR23, and the pixel circuits CR41 to CR43 are arranged in the second direction Y.

The pixel circuits CR11 to CR13 are sectioned by the control lines CL1 and CL2 and the signal lines SL1 to SL4. The pixel circuits CR21 to CR23 are sectioned by the control lines CL1 and CL2 and the signal lines SL4 to SL7. The pixel circuits CR31 to CR33 are sectioned by the control lines CL2 and CL3 and the signal lines SL1 to SL4. The pixel circuits CR41 to CR43 are sectioned by the control lines CL2 and CL3 and the signal lines SL4 to SL7.

Figure 8:
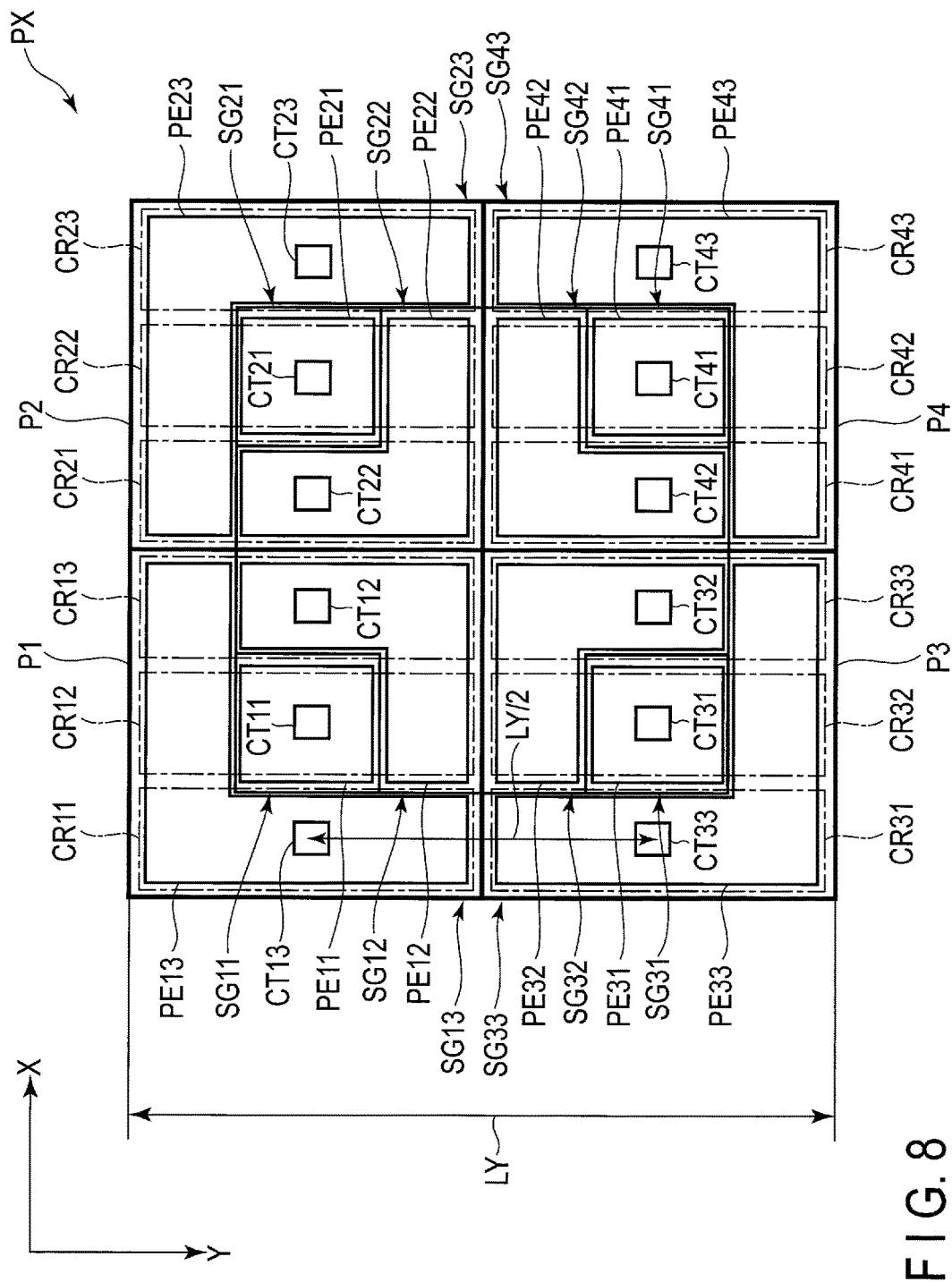
FIG. 8 is an illustration showing an example of connection between the pixel electrodes PE and the pixel circuits CR.

FIG. 8 is an illustration showing an example of connection between the pixel electrodes PE and the pixel circuits CR. It should be noted that the structure of each connection portion described below has been explained with reference to FIG. 5.

The sub-pixel P1 includes the pixel electrodes PE11 to PE13 located in the respective segments SG11 to SG13, and the pixel circuits CR11 to CR13. The pixel electrode PE11 is shaped in a rectangle corresponding to the shape of the segment SG11 and electrically connected with the pixel circuit CR12 by a connection portion CT11. The pixel electrode PE12 is shaped in an L letter corresponding to the shape of the segment SG12 and electrically connected with the pixel circuit CR13 by the connection portion CT12 inside the sub-area A12 shown in FIG. 6. The pixel electrode PE13 is shaped in an L letter corresponding to the shape of the segment SG13 and electrically connected with the pixel circuit CR11 by a connection portion CT13 inside the sub-area A13 shown in FIG. 6. As explained above, the pixel electrode PE11 has the same area as the segment SG11, the pixel electrode PE12 has the same area as the segment SG12, and the pixel electrode PE13 has the same area as the segment SG13. For this reason, the area ratio of the pixel electrodes PE11, PE12, and PE13 is 1:2:4 (=$2^0$:$2^1$:$2^2$).

Similarly to this, in the sub-pixel P2, the pixel electrode PE21 is electrically connected with the pixel circuit CR22 by a connection portion CT21. The pixel electrode PE22 is electrically connected with the pixel circuit CR21 by the connection portion CT22. The pixel electrode PE23 is electrically connected with the pixel circuit CR23 by a connection portion CT23.

The connection portions CT11 to CT13 and CT21 to CT23 are located on the same straight line along the first direction X and arranged in the first direction X with regular pitches. Hereinafter, the same straight line along the first direction X may be parallel to the first direction X.

In the sub-pixel P3, the pixel electrode PE31 is electrically connected with the pixel circuit CR32 by a connection portion CT31. The pixel electrode PE32 is electrically connected with the pixel circuit CR33 by the connection portion CT32. The pixel electrode PE33 is electrically connected with the pixel circuit CR31 by a connection portion CT33.

In the sub-pixel P4, the pixel electrode PE41 is electrically connected with the pixel circuit CR42 by a connection portion CT41. The pixel electrode PE42 is electrically connected with the pixel circuit CR41 by the connection portion CT42. The pixel electrode PE43 is electrically connected with the pixel circuit CR43 by a connection portion CT43.

The connection portions CT31 to CT33 and CT41 to CT43 are located on the same straight line along the first direction X and arranged in the first direction X with regular pitches. A pitch in the second direction Y between the position at which the connection portions CT11 to CT13 and CT21 to CT23 are arranged in the first direction X and the position at which the connection portions CT31 to CT33 and CT41 to CT43 are arranged in the first direction X is approximately a half of the length LY of the unit pixel PX in the second direction Y.

In addition, the area of the sub-pixel P1 is approximately equal to the total area of three segments SG11 to SG13, approximately equal to the total area of three pixel electrodes PE11 to PE13, and approximately equal to the total installation area of three pixel circuits CR11 to CR13. Similarly to this, the area of the sub-pixel P2 is approximately equal to the total installation area of the pixel circuits CR11 to CR23, the area of the sub-pixel P3 is approximately equal to the total installation area of three pixel circuits CR31 to CR33, and the area of the sub-pixel P4 is approximately equal to the total installation area of the pixel circuits CR41 to CR43. In addition, the area of the unit pixel PX1 is approximately equal to the total installation area of twelve pixel circuits, i.e., the pixel circuits CR11 to CR13, CR21 to CR23, CR31 to CR33, and CR41 to CR43.

Figure 9:
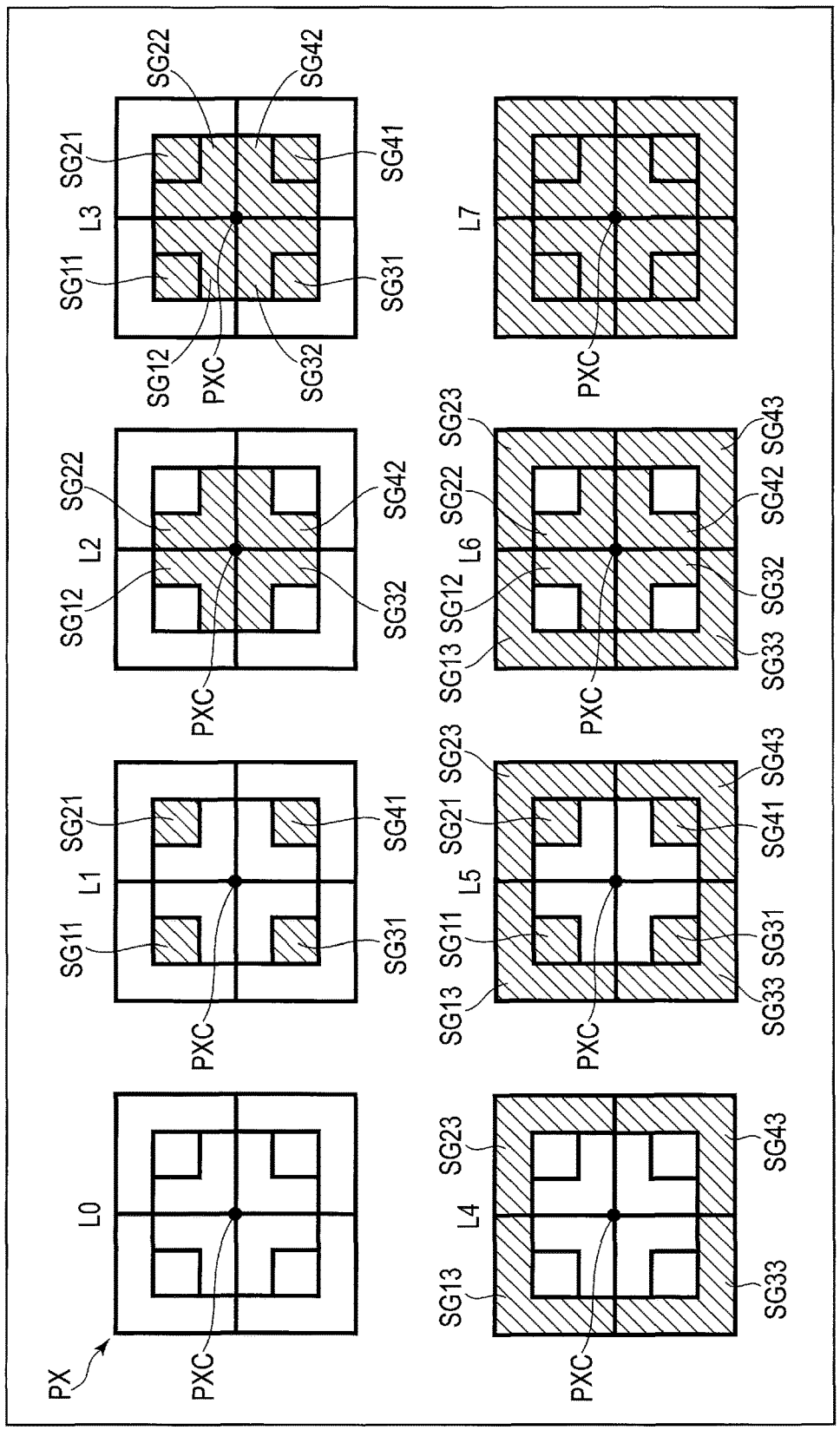
FIG. 9 shows states of the gradation display in the first configuration example of the embodiment.

FIG. 9 shows states of the gradation display in the first configuration example of the embodiment. In the drawing, L0 to L7 represent gradation values, indicating that transmittance or luminance per unit pixel is increased in this order.

At the gradation value L0, all the segments of the unit pixel PX become a state of exhibiting black.

At the gradation value L1, the segments SG11, SG21, SG31 and SG41 become a state of exhibiting white while the other segments become a state of exhibiting black.

At the gradation value L2, the segments SG12, SG22, SG32 and SG42 become a state of exhibiting white while the other segments become a state of exhibiting black.

At the gradation value L3, the segments SG11 and SG12, SG21 and SG22, SG31 and SG32, and SG41 and SG42 become a state of exhibiting white while the other segments become a state of exhibiting black.

At the gradation value L4, the segments SG13, SG23, SG33 and SG43 become a state of exhibiting white while the other segments become a state of exhibiting black.

At the gradation value L5, the segments SG11 and SG13, SG21 and SG23, SG31 and SG33, and SG41 and SG43 become a state of exhibiting white while the other segments become a state of exhibiting black.

At the gradation value L6, the segments SG12 and SG13, SG22 and SG23, SG32 and SG33, and SG42 and SG43 become a state of exhibiting white while the other segments become a state of exhibiting black.

At the gradation value L7, all the segments of the unit pixel PX become a state of exhibiting white.

The state of the segments exhibiting black corresponds to the off state of the segments, and also corresponds to the state in which the light reflected on the pixel electrode is absorbed into the optical element as explained above. The state of the segments exhibiting white corresponds to the on state of the segments, and also corresponds to the state in which the light reflected on the pixel electrode is transmitted through the optical element to exhibit the color of the corresponding color filter layer as explained above.

In the example illustrated, luminance center position of the unit pixel in each gradation is same as it is, and corresponds to the position of the geometric center PXC of the unit pixel PX.

According to the present configuration example, each of the sub-pixels P1 to P4 constituting the unit pixel PX includes three segments (for example, the segments SG11 to SG13 in FIG. 8) different in area, and two L-letter segments are disposed to surround a rectangular segment. In other words, at the central portion of each sub-pixel, three segments are arranged in the first direction X with the rectangular segment located at the center. The segments in each sub-pixel can be thereby disposed simply and compactly.

The pixel circuits CR corresponding to three segments, respectively, are configured in the same layout and arranged in the first direction X. In contrast, the pixel electrodes PE located in three segments, respectively, have different shapes corresponding to the shapes of the respective segments and, as explained above, the pixel electrodes PE corresponding to three segments, respectively, are arranged in the first direction at the central portion of each sub-pixel. For this reason, a conductor having a function of only relaying the pixel electrodes PE and the pixel circuits CR does not need to be disposed in a layer between the pixel electrodes and the pixel circuits in each sub-pixel. In the present configuration example, the pixel circuits CR of the same layout and the pixel electrodes PE of different shapes can easily be connected at the connection portions CT arranged in the first direction X.

An additional manufacturing process to dispose a conductor for relay and the like is therefore unnecessary. In addition, the layout of the pixel circuits CR does not need to be changed in accordance with the shape of the segments, and the load on the circuit design can be reduced. Since the layout of each pixel circuit CR is not restricted by the position at which the pixel circuit is connected to the pixel electrode PE, the pixel circuits CR can be integrated in the area of the limited area and the definition can be made higher.

In two sub-pixels arranged in the second direction Y, the same layout can be applied to the corresponding pixel circuits CR, and the pitch of the connection portions CT in the second direction Y is a half of the length LY of the unit pixel PX in the second direction Y. The pitch in the second direction Y at the positions at which three segments are arranged in the first direction in each sub-pixel is also a half of the length LY of the unit pixel PX in the second direction Y. For this reason, the pixel circuits CR and the pixel electrodes PE can easily be connected, respectively, in each of the sub-pixels arranged in the second direction Y, too.

In the unit pixel PX, the sub-pixels P1 and P4 are configured to have line symmetry with respect to the boundaries B1 and B2 and to have point symmetry with respect to the geometric center PXC of the unit pixel PX. For this reason, the luminance center position of the unit pixel is invariable in the state of displaying each gradation and corresponds to the position of the geometric center PXC of the unit pixel PX. Deterioration in display quality can be therefore suppressed.

«First Configuration Example: Modified Example»

Figure 10:
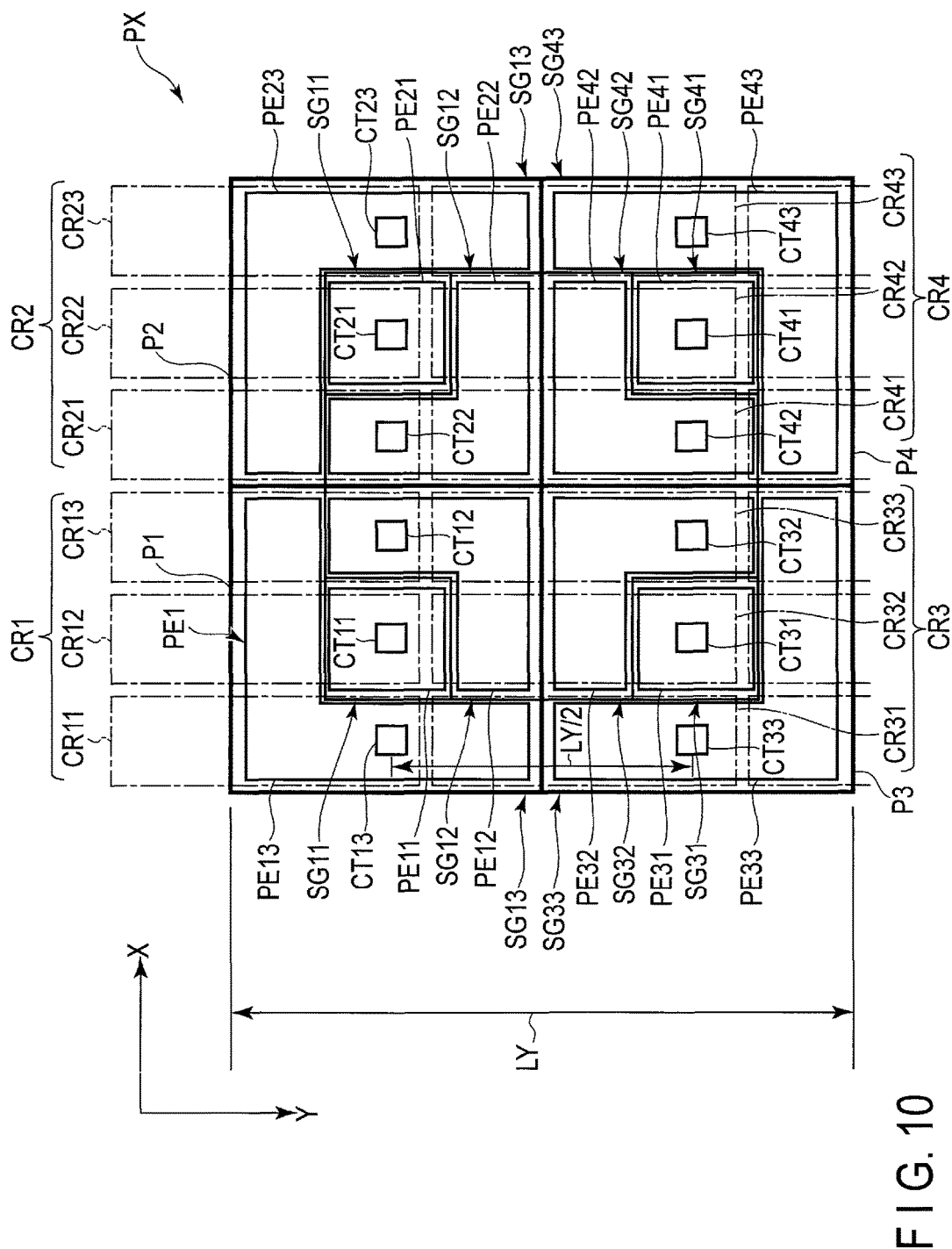
FIG. 10 is an illustration showing another example of connection between the pixel electrodes PE and the pixel circuits CR in the unit pixel PX of the configuration shown in FIG. 6.

FIG. 10 is an illustration showing another example of connection between the pixel electrodes PE and the pixel circuits CR in the unit pixel PX of the configuration shown in FIG. 6.

The pixel circuits CR11 to CR13 and CR21 to CR23 are arranged in the first direction X. The pixel circuits CR31 to CR33 and CR41 to CR43 are arranged in the first direction X. The configuration of each pixel circuit is as follows.

The electric connection between the pixel electrodes and the pixel circuits in each of the sub-pixels P1 to P4 has been explained with reference to FIG. 8. The sub-pixel P1 alone will be explained below. An electrode group PE1 includes the pixel electrodes PE11 to PE13. A circuit group CR1 includes the pixel circuits CR11 to CR13. The pixel electrode PE11 is electrically connected with the pixel circuit CR12 by the connection portion CT11. The pixel electrode PE12 is electrically connected with the pixel circuit CR13 by the connection portion CT12. The pixel electrode PE13 is electrically connected with the pixel circuit CR11 by the connection portion CT13. The pixel circuits CR11 to CR13 are formed in regions having a length in the first direction X smaller than a length in the second direction Y, and arranged in the first direction X. The connection portions CT11 to CT13 are sifted from central portions of the pixel circuits CR11 to CR13 in the second direction Y, respectively. The connection portions CT11 to CT13 are located on the same straight line that extends through a central portion of an electrode group PE1 and extends along the first direction X. A part of the electrode group PE1 is arranged in the first direction X, at a position at which at least the connection portions CT11 to CT13 are arranged. A part of the electrode group PE1 is sifted from the position overlaid on the circuit group CR1 and is overlaid on a circuit group of the other sub-pixel adjacent in the second direction Y. Explanations on the connection of the other sub-pixels P2 to P4 are omitted.

The connection portions CT11 to CT13 and CT21 to CT23 are arranged in the first direction X with regular pitches. The connection portions CT31 to CT33 and CT41 to CT43 are arranged in the first direction X with regular pitches. The pitch in the second direction Y between the position at which the connection portions CT11 to CT13 are arranged in the first direction X and the position at which the connection portions CT31 to CT33 are arranged in the first direction X is approximately a half of the length LY of the unit pixel PX in the second direction Y.

In this example, too, the same advantages as those of the above-described first configuration example can be obtained.

Next, the other configuration examples of the unit pixel PX applicable to the embodiment will be described.

«Second Configuration Example»

Figure 11:
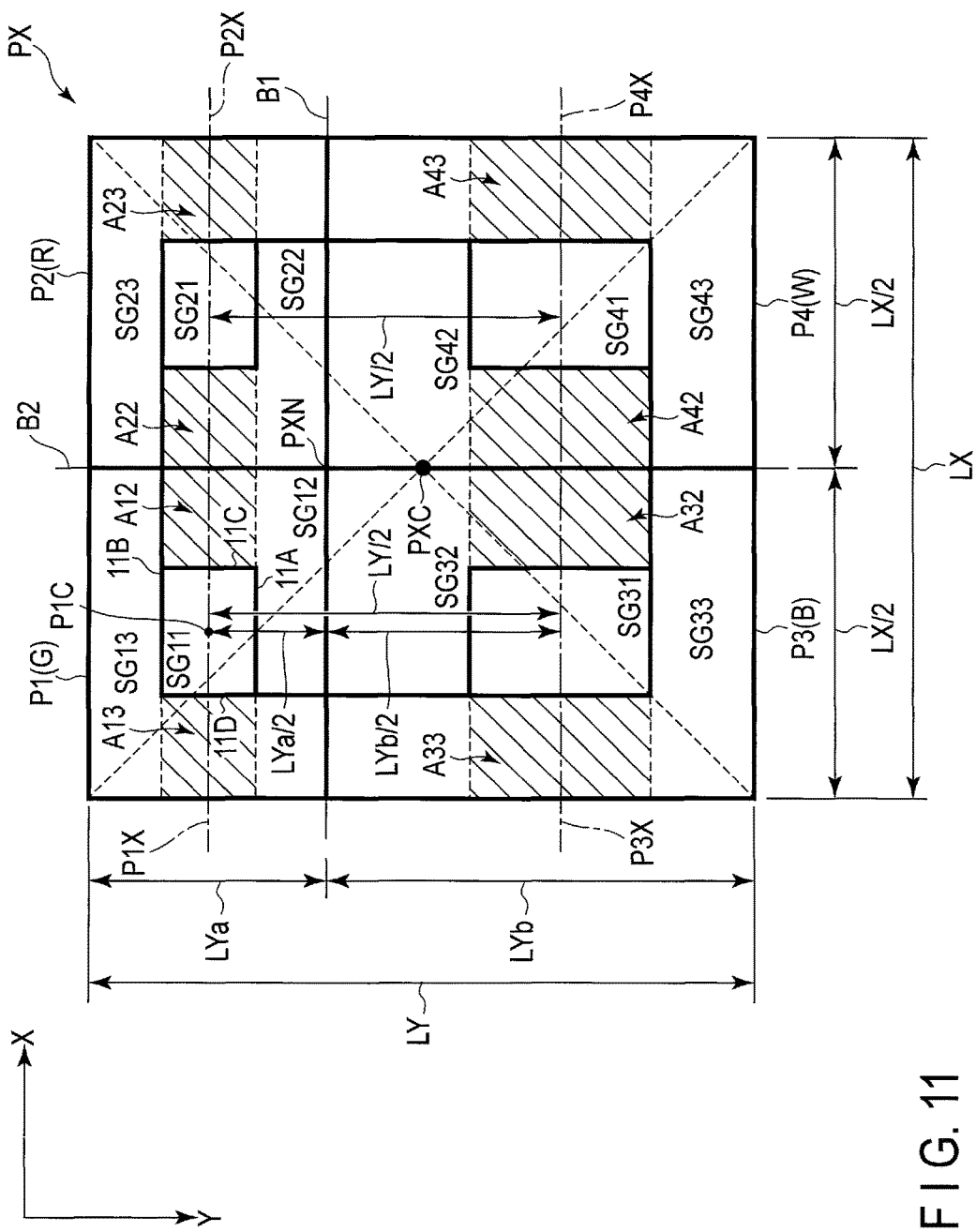
FIG. 11 is an illustration showing a second configuration example of the unit pixel PX.

FIG. 11 is an illustration showing a second configuration example of the unit pixel PX. The second configuration example shown in FIG. 11 is different from the first configuration example shown in FIG. 6 with respect to the feature that each of the sub-pixels P3 and P4 has a larger area than each of the sub-pixels P1 and P2.

The unit pixel PX is configured to be in a square shape in which the length LX in the first direction X is equal to the length LY in the second direction Y. Four sub-pixels P1 to P4 constituting the unit pixel PX exhibit different colors, the sub-pixel P1 exhibits a green color, the sub-pixel P2 exhibits a red color, the sub-pixel P3 exhibits a blue color, and the sub-pixel P4 exhibits a white color.

The sub-pixels P1 and P2 arranged in the first direction X have equal areas. Each of the sub-pixels P1 and P2 is configured to be in a rectangular shape having a length LX/2 in the first direction X and a length LYa in the second direction Y. In the example illustrated, each of the sub-pixels P1 and P2 is configured to be in a longitudinally extending rectangular shape in which the length LX/2 is greater than the length LYa.

The sub-pixels P3 and P4 arranged in the first direction X have equal areas. Each of the sub-pixels P3 and P4 is configured to be in a rectangular shape having a length LX/2 in the first direction X and a length LYb in the second direction Y. The length LYb is greater than the length LYa and length LX/2. In the example illustrated, each of the sub-pixels P3 and P4 is configured to be in a longitudinally extending rectangular shape in which the length LX/2 is greater than the length LYa.

In the embodiment, the sub-pixels P1 and P3 arranged in the second direction Y have the same lengths in the first direction X while the sub-pixel P1 is shaped in a longitudinally extending rectangle and the sub-pixel P3 is shaped in a vertically extending rectangle. If an aspect ratio A of each sub-pixel is equal to the length in the second direction Y divided by the length in the first direction X, an aspect ratio A1 of the sub-pixel P1 is greater than 0 and smaller than 1 and an aspect ratio A3 of the sub-pixel P3 is greater than 1. The relationship between the sub-pixels P2 and P4 is similar to the relationship between the sub-pixels P1 and P3.

The area of the sub-pixel P1 and the area of the sub-pixel P3 will be compared. The sub-pixels P1 and P3 have the same lengths LX/2 in the first direction X. The length LYa of the sub-pixel P1 in the second direction Y is smaller than the length LYb of the sub-pixel P3 in the second direction Y. For this reason, the area of the sub-pixel P1 is smaller than the area of the sub-pixel P3. Similarly to this, the area of the sub-pixel P2 is smaller than the area of the sub-pixel P4.

In the unit pixel PX, the sub-pixel P1 is configured to have line symmetry of the sub-pixel P2 with respect to the boundary B2. Similarly to this, the sub-pixel P3 is configured to have line symmetry of the sub-pixel P4 with respect to the boundary B2.

The area of each of the segments SG11 and SG13 constituting the sub-pixel P1 is smaller than the area of each of the segments SG31 and SG33 constituting the sub-pixel P3. For this reason, the configuration of the sub-pixel P1 is asymmetric with the configuration of the sub-pixel P3 with respect to the boundary B1. Similarly to this, the area of each of the segments SG21 and SG23 constituting the sub-pixel P2 is smaller than the area of each of the segments SG41 and SG43 constituting the sub-pixel P4. For this reason, the configuration of the sub-pixel P2 is asymmetric with the configuration of the sub-pixel P4 with respect to the boundary B1.

The basic configuration of each of the sub-pixels P1 to P4 is the same as the above-described first configuration example. In other words, the sub-pixel P1 includes the segments SG11 to SG13. The area ratio of the segments SG11, SG12 and SG13 is, for example, 1:2:4 ($=2^0:2^1:2^2$). The segment SG11 is located at the central portion of the sub-pixel P1, the segment SG12 is located on the side closer to the geometric center PXC than the segment SG11, and the segment SG13 is located on the side farther from the geometric center PXC than the segment SG11. In the unit pixel PX of the illustrated configuration, the central portion is a region including a middle point of the length LYa of the sub-pixel P1 in the second direction Y or a position P1C remote from the boundary B1 at a distance of LYa/2 in the second direction Y. The geometric center PXC is defined as a point of intersection of two diagonal lines represented by dotted lines in the drawing. The geometric center PXC is located on the boundary B2 since the unit pixel PX is configured to have line symmetry with respect to the boundary B2. In addition, the geometric center PXC is remote from the boundary B1 since the unit pixel PX is configured to be asymmetric with the boundary B1. In other words, the position of the geometric center PXC is different from the position of a point of intersection PXN of the boundaries B1 and B2.

Similarly to this, the sub-pixel P2 includes the segments SG21 to SG23, the sub-pixel P3 includes the segments SG31 to SG33, and the sub-pixel P4 includes the segments SG41 to SG43.

In the sub-pixels P1 to P4, the segments SG12, SG22, SG32, and SG42 corresponding to middle bit (for example, $2^1$) in 3-bit area gradation are located most closely to the center PXC and located most closely to the point of intersection PXN. In the sub-pixels P1 to P4, the segments SG13, SG23, SG33, and SG43 corresponding to the most significant bits (for example, $2^2$) in 3-bit area gradation are located farthest from the center PXC. The segments SG11, SG21, SG31, and SG41 corresponding to the least significant bits (for example, $2^0$) in 3-bit area gradation are located at the central portions of the sub-pixels P1 to P4, respectively.

A positional relationship of twelve segments forming the illustrated unit pixel PX is as follows from the other point of view. When attention is focused on the sub-pixels P1 and P2 arranged in the first direction X, three segments SG11 to SG13 of the sub-pixel P1 are disposed to have line symmetry of three segments SG21 to SG23 of the sub-pixel P2 with respect to the boundary B2. When attention is focused on the sub-pixels P3 and P4 arranged in the first direction X, three segments SG31 to SG33 of the sub-pixel P3 are disposed to have line symmetry of three segments SG41 to SG43 of the sub-pixel P4 with respect to the boundary B2.

In the second configuration example, too, three segments SG11 to SG13 are arranged in the first direction X at the central portion of the sub-pixel P1, three segments SG21 to SG23 are arranged in the first direction X at the central portion of the sub-pixel P2, three segments SG31 to SG33 are arranged in the first direction X at the central portion of the sub-pixel P3, three segments SG41 to SG43 are arranged in the first direction X at the central portion of the sub-pixel P4, similarly to the first configuration example shown in FIG. 6. A center line of the region in which three segments SG11 to SG13 of the sub-pixel P1 are arranged in the first direction X is denoted by P1X while a center line of the region in which three segments SG31 to SG33 of the sub-pixel P3 are arranged in the first direction X is denoted by P3X. An interval between the center lines P1X and P3X in the second direction Y is approximately a half of a length LY of the unit pixel PX in the second direction Y. Similarly to this, a center line of the region in which three segments SG21 to SG23 of the sub-pixel P2 are arranged in the first direction X is denoted by P2X. A center line of the region in which three segments SG41 to SG43 of the sub-pixel P4 are arranged in the first direction X is denoted by P4X. An interval between the center lines P2X and P4X in the second direction Y is approximately a half of a length LY of the unit pixel PX.

Figure 12:
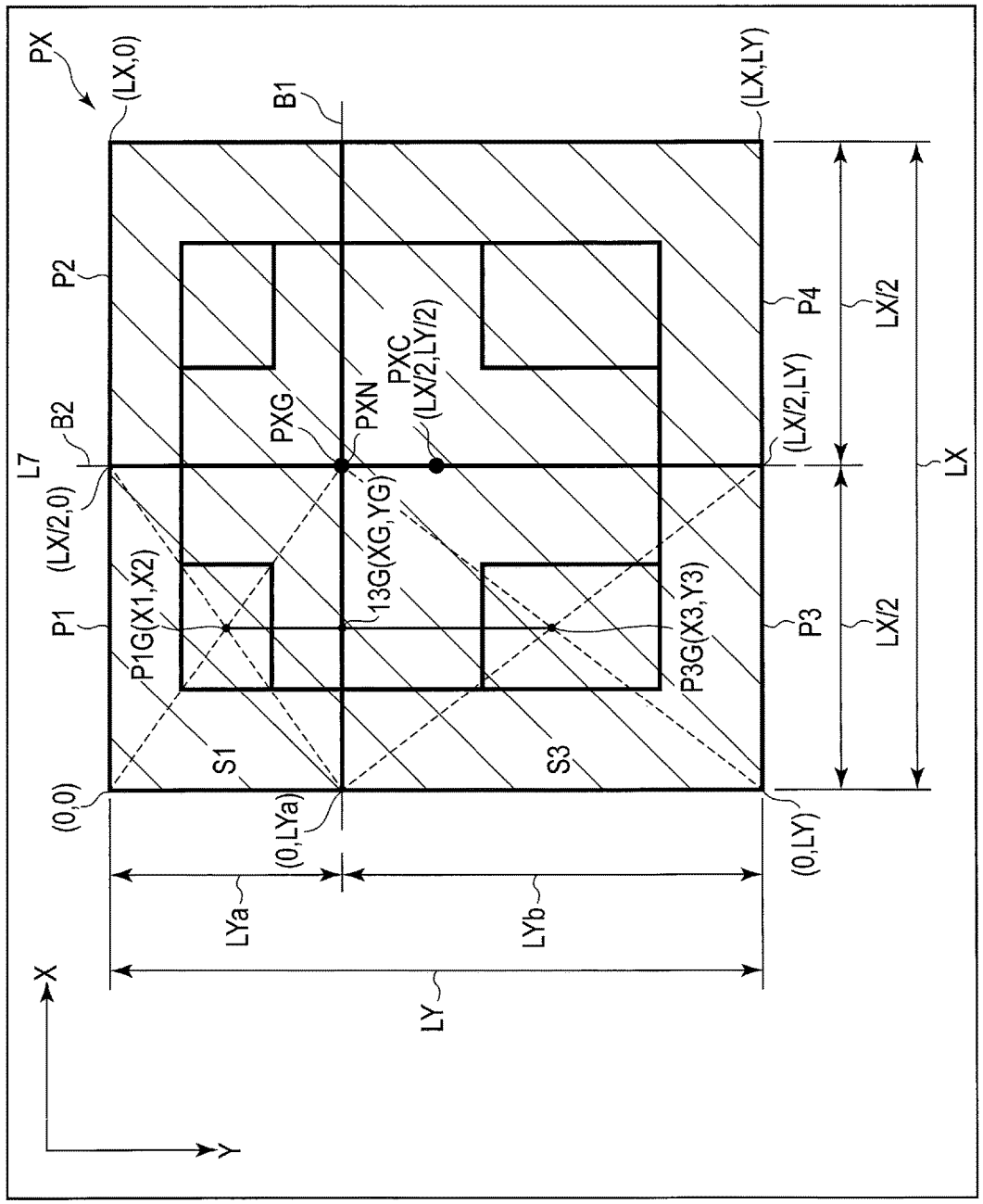
FIG. 12 is an illustration showing a luminance center in the unit pixel PX in a case where all segments are in an on state.

FIG. 12 is an illustration showing a luminance center in the unit pixel PX in a case where all the segments are in the on state.

In the example illustrated, the unit pixel PX displays gradation value L7 which will be explained later with reference to FIG. 14, and all the segments are in a state of being turned on. In the drawing, a position of an angle farthest from the geometric center PXC in the sub-pixel P1 is referred to as an origin, and is represented as coordinates (x, y), using coordinate x in the first direction X and coordinate y in the second direction Y. At this time, the unit pixel PX is represented as a rectangle having configured to be in a square shape having vertexes of coordinates (0, 0), (LX, 0), (0, LY) and (LX, LY). The boundary B1 is a straight line passing through coordinates (0, LYa) and extending in the first direction X, and the boundary B2 is a straight line passing through coordinates (LX/2, 0) and extending in the second direction Y. Coordinates of a point of intersection of the boundaries B1 and B2 are represented as (LX/2, LYa).

It is assumed that a luminance center P1G of the sub-pixel P1 is located at coordinates (X1, Y1), that a luminance center P3G of the sub-pixel P3 is located at coordinates (X3, Y3), and that a luminance center 13G of the sub-pixels P1 and P3 is located at coordinates (XG, YG). Then, coordinates of the luminance center 13G are defined by the following expressions (1) and (2).

$$XG=(S3 \times X1+S1 \times X3)/(S1+S3) \qquad (1)$$

$$YG=(S3 \times Y1+S1 \times Y3)/(S1+S3) \qquad (2)$$

At this time, S1 represents an area of an on-state region in the sub-pixel P1 and S3 represents an area of an on-state region in the sub-pixel P3. The luminance center 13G is located on a line segment connecting the luminance centers P1G and P3G such that a ratio of a length of a line segment connecting the luminance centers 13G and P1G and a length of a line segment connecting the luminance centers 13G and P3G is S1:S3.

The luminance center PXG of the unit pixel PX is located on the boundary B2, at the same coordinates as the luminance center 13G in the second direction Y since the unit pixel PX is configured to have line symmetry with respect to the boundary B2. In other words, the luminance center PXG is located at coordinates (LX/2, YG).

At the gradation value L7, rectangular regions of the sub-pixels P1 and P3 are assumed to be in the on state. For this reason, the area S1 corresponds to the area of the sub-pixel P1, and the area S3 corresponds to the area of the sub-pixel P3. The luminance center P1G is assumed to be located at a point of intersection of diagonal lines of a rectangle defined on the outer periphery of the sub-pixel P1, and the luminance center P3G is assumed to be located at a point of intersection of diagonal lines of a rectangle defined on the outer periphery of the sub-pixel P3. Therefore, S1=LYa×(LX/2), S3=LYb×(LX/2), Y1=LYa/2, and Y3=LYa+LYb/2. By substituting them into equation (2), YG=LYa can be obtained. In other words, the position of the luminance center PXG is the same as the point of intersection of the boundaries B1 and B2, and coordinates of the position are represented as (LX/2, LYa).

The geometric center PXC of the unit pixel PX is represented as coordinates (LX/2, LY/2). In other words, the luminance center PXG and the geometric center PXC are located on the boundary B2. In addition, the luminance center PXG and the geometric center PXC match in the first direction X and are shifted in the second direction Y by a distance (LY/2−LYa).

FIG. 13 is an illustration showing an example of connection between the pixel electrodes PE and the pixel circuits CR in the unit pixel PX of the configuration shown in FIG. 11.

The pixel circuits CR11 to CR13 and CR21 to CR23 are arranged in the first direction X. The pixel circuits CR31 to CR33 and CR41 to CR43 are arranged in the first direction X. The configuration of each pixel circuit is as follows.

The electric connection between the pixel electrodes and the pixel circuits in each of the sub-pixels P1 to P4 has been explained with reference to FIG. 8. The sub-pixel P1 alone will be explained below. The pixel electrode PE11 is electrically connected with the pixel circuit CR12 by the connection portion CT11. The pixel electrode PE12 is electrically connected with the pixel circuit CR13 by the connection portion CT12. The pixel electrode PE13 is electrically connected with the pixel circuit CR11 by the connection portion CT13. Explanations on the connection of the other sub-pixels P2 to P4 are omitted.

The connection portions CT11 to CT13 and CT21 to CT23 are located on the same straight line along the first direction X and arranged in the first direction X with regular pitches. The connection portions CT31 to CT33 and CT41 to CT43 are located on the same straight line along the first direction X and arranged in the first direction X with regular pitches. A center line of a region in which the connection portion CT11 to CT13 and CT21 to CT23 are arranged in the first direction X is denoted by P12X. A center line of a region in which the connection portion CT31 to CT33 and CT41 to CT43 are arranged in the first direction X is denoted by P34X. An interval between the center lines P12X and P34X in the second direction Y is approximately a half of the length LY of the unit pixel P in the second direction Y.

In the second configuration example, too, the same advantages as those of the first configuration example can be obtained. In addition, the areas of the sub-pixels P1 to P4 constituting the unit pixel PX can be set in accordance with hue, white balance, and the like required for the unit pixel PX, in the second configuration example.

States of the gradation display in the second configuration example will be explained below.

Figure 14:
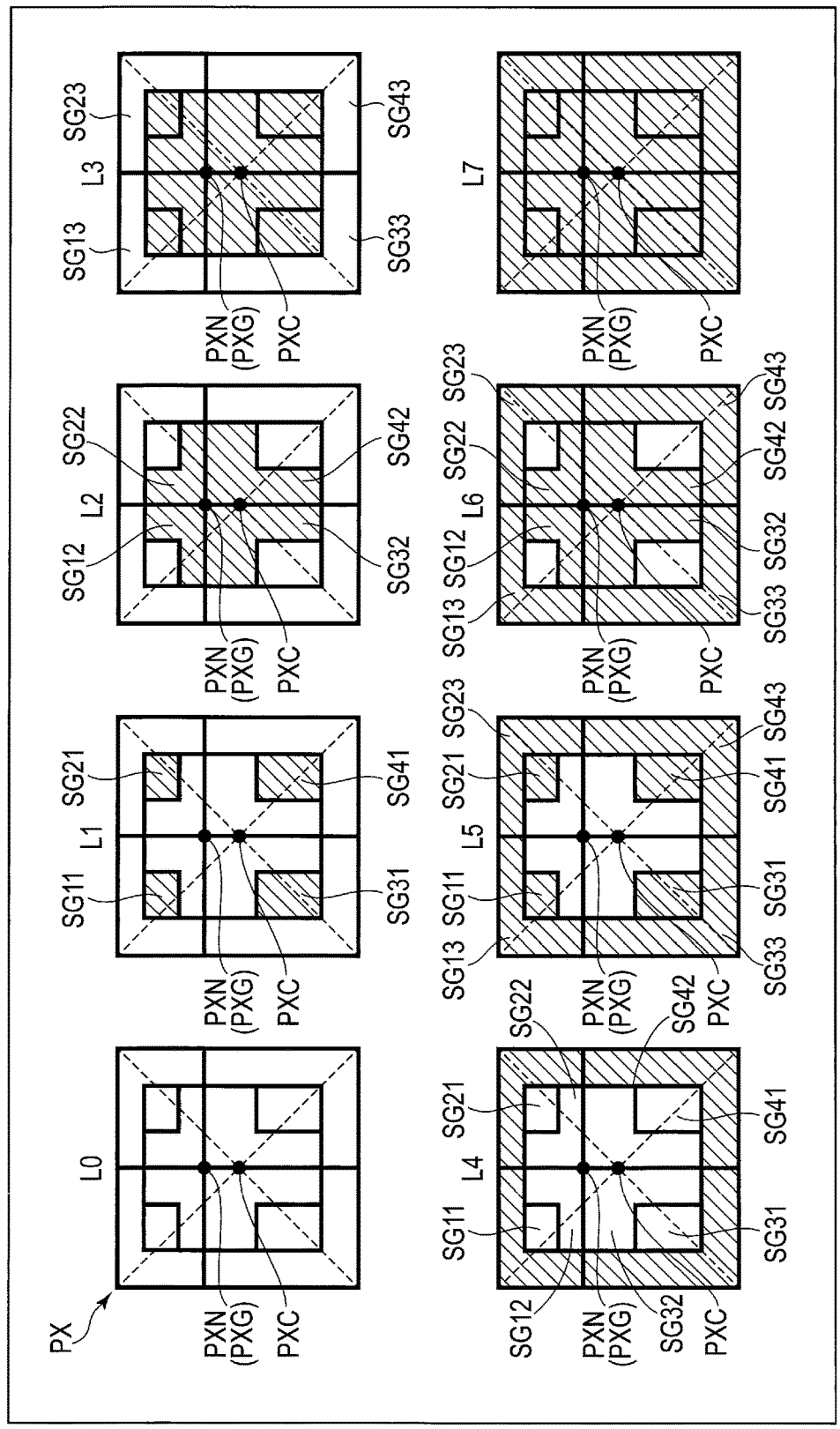
FIG. 14 shows states of the gradation display in the second configuration example of the embodiment.

FIG. 14 shows states of the gradation display in the second configuration example of the embodiment. In the drawing, L0 to L7 represent gradation values, indicating that transmittance or luminance per unit pixel is increased in this order. Explanations of the gradation display states shown in FIG. 14 are omitted since they are duplication of the explanations of FIG. 9.

At gradation value L0, all the segments of the unit pixel PX become an off state (black display state). At gradation value L1, the segments SG11, SG21, SG31 and SG41 become an on state (white display state). At gradation value L2, the segments SG12, SG22, SG32 and SG42 become an on state. At gradation value L3, the segments SG11, SG12, SG21, SG22, SG31, SG32, SG41 and SG42 become an on state. At gradation value L4, the segments SG13, SG23, SG33, and SG43 become an on state. At gradation value L5, the segments SG11, SG13, SG21, SG23, SG31, SG33, SG41 and SG43 become an on state. At gradation value L6, the segments SG12, SG13, SG22, SG23, SG32, SG33, SG42 and SG43 become an on state. At gradation value L7, all the segments of the unit pixel PX become an on state.

In the first configuration example shown in FIG. 9, luminance center position of the unit pixel is invariable in the state of displaying each gradation and corresponds to the position of the geometric center PXC of the unit pixel PX. In contrast, in the second configuration example shown in FIG. 14, the position of the luminance center PXG of the unit pixel PX is substantially the same in the state of displaying each gradation, different from the geometric center PXC of the unit pixel PX, and substantially the same as the position of intersection of the boundaries B1 and B2.

The luminance center PXG of the unit pixel PX in the state of the gradation value LT at which the unit pixel PX becomes the maximum luminance has been explained with reference to FIG. 12. Next, the luminance center PXG of the unit pixel PX in the state of halftone of the gradation values L1 to L6 will be explained in relation to, for example, the gradation values L1 and L4.

Figure 15:
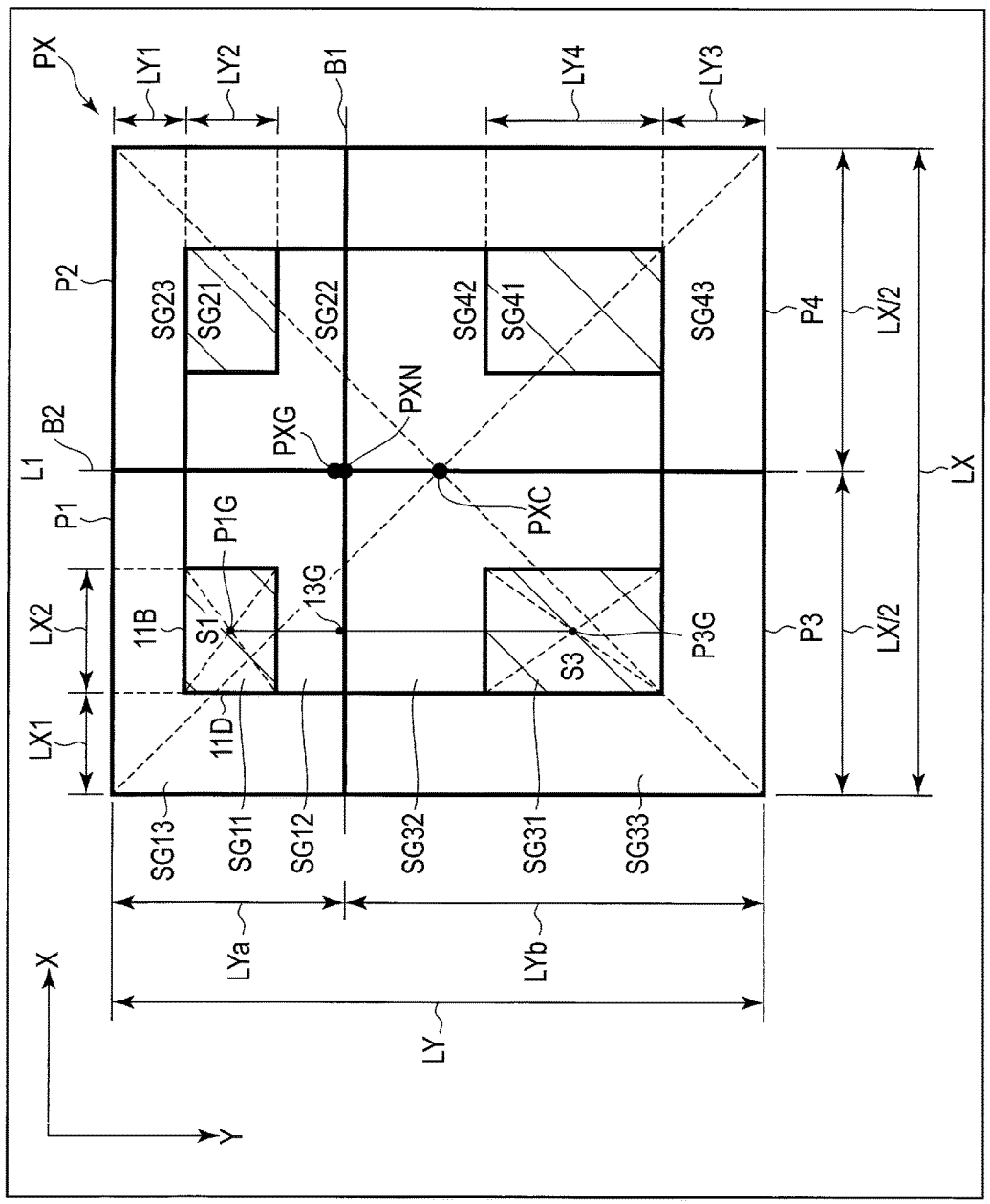
FIG. 15 is an illustration showing a luminance center in the unit pixel at a gradation value L1 shown in FIG. 14.

FIG. 15 is an illustration showing the luminance center in the unit pixel at the gradation value L1 shown in FIG. 14. The layout of the sub-pixels P1 to P4, and the segments SG11 to SG31, SG21 to SG23, SG31 to SG33, and SG41 to SG43 is the same as that in the unit pixel PX shown in FIG. 12. A width of the first direction X of the segments SG13 and SG33 located to be adjacent to the boundary B1 is denoted by LX1, a width of the second direction Y of the segment SG13 located to be adjacent to the boundary B2 is denoted by LY1, and a width of the second direction Y of the segment SG33 located to be adjacent to the boundary B2 is denoted by LY3. A width of the first direction X of the segments SG11 and SG31 is denoted by LX2, a width of the second direction Y of the segment SG11 is denoted by LY2, and a width of the second direction Y of the segment SG31 is denoted by LY4.

In the example illustrated, the segments SG11, SG21, SG31, and SG41 are in the on state as represented by hatch lines in the drawing. At this time, the luminance centers P1G and P3G of the respective sub-pixels P1 and P3 correspond to the luminance centers of the segments SG11 and SG31. The luminance center PXG of the unit pixel PX is located at coordinates (LX/2, YG) as shown in FIG. 12. YG is obtained by the following calculation.

For example, it is assumed that each of LX and LY is 346, LYa is 130, LYb is 216, LX1 is 65, LX2 is 59.75, LY1 is 49, LY2 is 44.9, LY3 is 78, and LY4 is 77.75. The luminance center P1G is represented as coordinates (X1, Y1)=(94.88, 71.29). The luminance center P3G is represented as coordinates (X3, Y3)=(94.88, 229.13). The area of the on-state region in the sub-pixel P1 is represented as S1=2683. The area of the on-state region in the sub-pixel P3 is represented as S3=4646. By substituting these numbers into equation (2), YG is calculated at 129.1. The geometric center PXC of the unit pixel PX, the point of intersection PXN of the boundaries B1 and B2, and the luminance center PXG of the unit pixel PX are represented as coordinates (173, 173), (173, 130) and (173, 129.1). Displacement of the luminance center PXG from the geometric center PXC is represented as the Y coordinate of 43.9 (=173−129.1). Displacement of the luminance center PXG from the point of intersection PXN is represented by the Y coordinate of 0.9 (=130−129.1), which is 0.69% based on the coordinate of the point of intersection PXN. In other words, the position of the luminance center PXG is different from the position of the geometric center PXC and is substantially the same as the point of intersection PXN.

Figure 16:
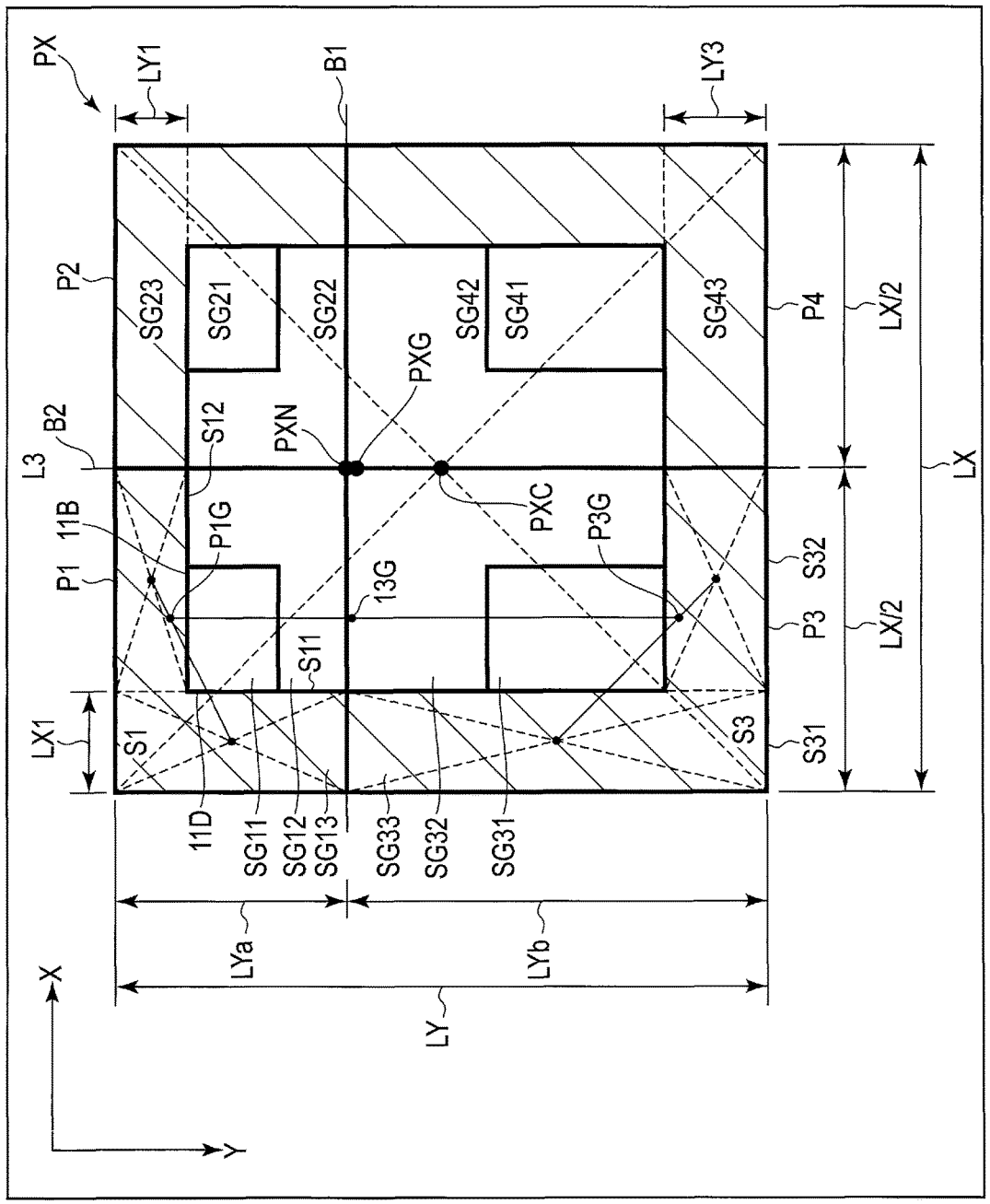
FIG. 16 is an illustration showing a luminance center in the unit pixel at a gradation value L4 shown in FIG. 14.

FIG. 16 is an illustration showing the luminance center in the unit pixel at the gradation value L4 shown in FIG. 14. In the example illustrated, the segments SG13, SG23, SG33, and SG43 are in the on state as represented by hatch lines in the drawing. At this time, the luminance centers P1G and P3G of the respective sub-pixels P1 and P3 correspond to the luminance centers of the segments SG13 and SG33. The luminance center of the L-letter segment SG13 can be calculated by the expression (2) with respect to luminance centers of two rectangular sub-segments S11 and S12. The sub-segment S11 is a rectangle which is adjacent to the boundary B1 to extend in the second direction Y. The sub-segment S12 is a rectangle which is located between the boundary B2 and the sub-segment S11 to extend in the first direction X. The luminance center of the L-letter segment SG33 can be calculated by the expression (2) with respect to luminance centers of two rectangular sub-segments S31 and S32. The sub-segment S31 is a rectangle which is adjacent to the boundary B1 to extend in the second direction Y. The sub-segment S32 is a rectangle which is located between the boundary B2 and the sub-segment S31 to extend in the first direction X.

The size of the unit pixel PX shown in FIG. 16 is assumed to be the same as that in FIG. 15. The luminance center P1G is represented as coordinates (X1, Y1)=(85.7, 40.1). The luminance center P3G is represented as coordinates (X3, Y3)=(86.6, 281.1). The area of the on-state region in the sub-pixel P1 is represented as S1=13742. The area of the on-state region in the sub-pixel P3 is represented as S3=22464. By substituting these numbers into equation (2), YG is calculated at 129.1. By substituting these numbers into equation (2), YG is calculated at 131.4. The geometric center PXC of the unit pixel PX and the position of the point of intersection PXN of the boundaries B1 and B2 have been explained with reference to FIG. 15. The luminance center PXG is represented as coordinates (173, 131.4). Displacement of the luminance center PXG from the geometric center PXC is represented as the Y coordinate of 41.6 (=173−131.4). Displacement of the luminance center PXG from the point of intersection PXN is represented as the Y coordinate of 1.4 (=131.4−130), which is 1.08% based on the coordinate of the point of intersection PXN. In other words, the position of the luminance center PXG is different from the position of the geometric center PXC and is substantially the same as the point of intersection PXN.

In the second configuration example, the unit pixel PX comprises the sub-pixels P1 and P2 arranged in the first direction X, and the sub-pixels P3 and P4 arranged in the first direction X, and each the sub-pixels P1 to P4 comprises three segments. The luminance center of the unit pixel PX is substantially the same in the state of displaying each gradation and is different from the position of the geometric center PXC of the unit pixel PX. The display device DSP can improve the color balance in the unit pixel PX by setting the blue sub-pixel P3 of low luminosity to be larger than the red sub-pixel P1 and the green sub-pixel P2. In addition, the display device DSP can improve the luminance of the unit pixel PX by setting the white sub-pixel P4 giving a great influence to the luminance to be larger than the red sub-pixel P1 and the green sub-pixel P2. Furthermore, the display device can suppress the deterioration in gradation property since the pitches between the positions of the luminance centers PXG of the adjacent unit pixels PX are not varied at each of gradations L0 to L7. In other words, in the present configuration example, the luminance center PXG of the unit pixel PX can be made substantially the same irrespective of each of the gradations L0 to L7 while improving the color balance of the unit pixel PX by changing the size of the sub-pixels P1 and P4 corresponding to each of colors in the unit pixel PX, and the image quality can be thereby improved.

The display device capable of improving the display quality in the configuration employing the area gradation method can be therefore provided.

In addition, the sub-pixel P1 comprises the rectangular segment SG11, the L-letter segment SG12 located on the side closer to the geometric center PXC of the unit pixel PX than to the segment SG11, and the L-letter segment SG13 located on the side farther from the geometric center PXC than from the segment SG11. The movement of the luminance center of the sub-pixel P1 can be thereby made small at each of the gradations L0 to L7. The display device capable of improving the display quality can be therefore provided.

«Second Configuration Example: First Modified Example»

Figure 17:
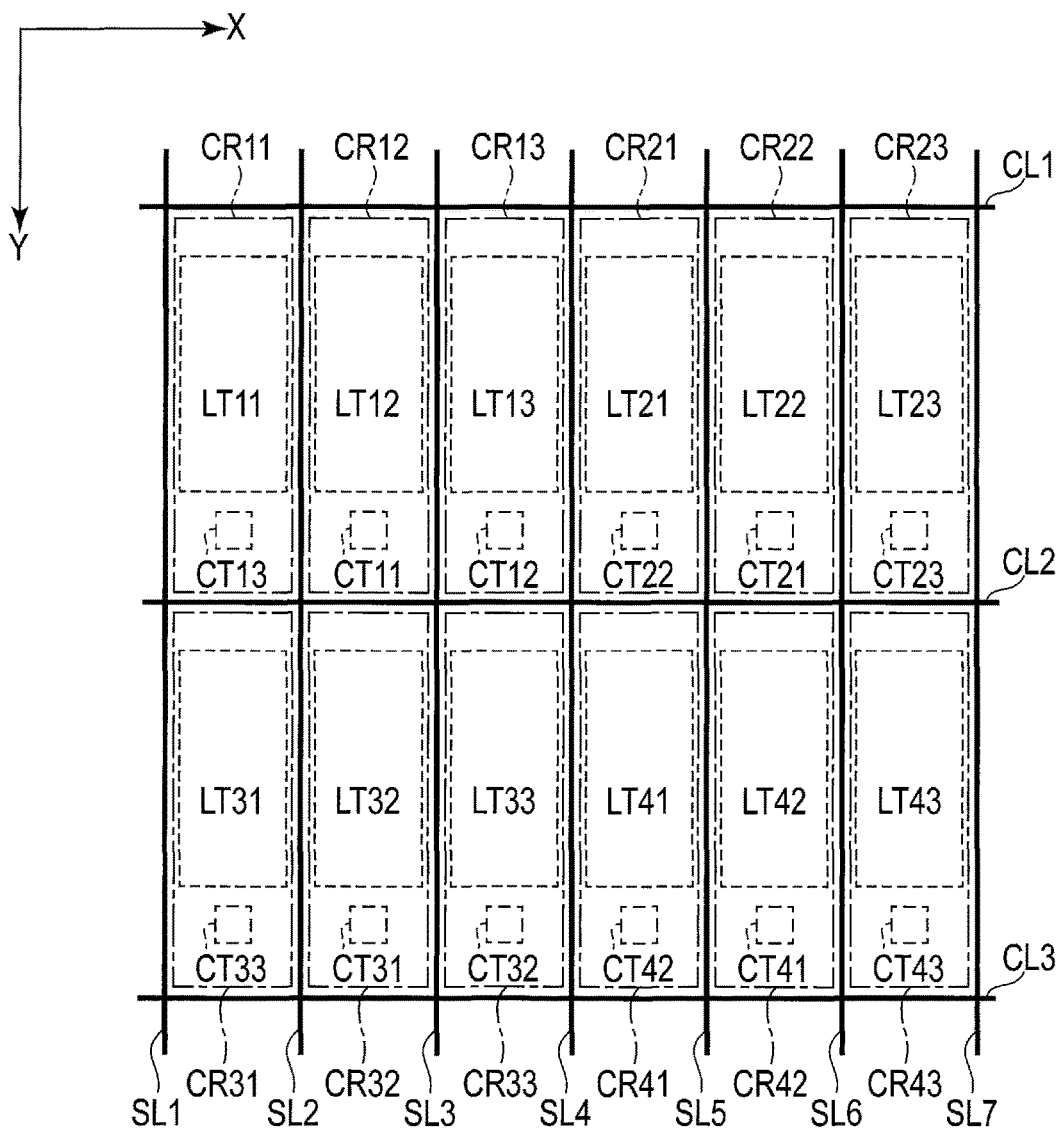
FIG. 17 is an illustration showing another example of the layout of pixel circuits CR.

FIG. 17 is an illustration showing another example of the layout of pixel circuits CR. The layout of the pixel circuits CR11 to CR13, CR21 to CR23, CR31 to CR33, and CR41 to CR43 has been explained with reference to FIG. 7.

The configuration of the pixel circuits will be explained here with reference to, for example, the pixel circuits CR11 to CR13. The latch modules LT explained with reference to FIG. 2 and the connection portions CT explained with reference to FIG. 5 are disposed in the regions corresponding to the pixel circuits CR, in planar view. For example, the latch modules LT and the connection portions CT are arranged to be adjacent to each other in the second direction Y. The pixel circuits CR11 to CR13 comprise the latch modules LT11 to LT13 at the central portions, respectively, in planar view. The connection portion CT13 connecting the pixel electrode PE13 with the pixel circuit CR11 is disposed in the region corresponding to the pixel circuit CR11 as explained with reference to FIG. 13 and the like. Similarly to this, the connection portion CT11 connecting the pixel electrode PE11 with the pixel circuit CR12 is disposed in the region corresponding to the pixel circuit CR12. The connection portion CT12 connecting the pixel electrode PE12 with the pixel circuit CR13 is disposed in the region corresponding to the pixel circuit CR13. The connection portions CT13, CT11 and CT12 are shifted from the central portions of the pixel circuits CR11 to CR13 in the second direction Y in planar view to prevent overlaying on the latch modules LT11 to LT13. In the example illustrated, the connection portion CT13 is disposed between the latch modules LT11 and LT31 arranged in the second direction Y. Each of the connection portions CT11 and CT12 is also disposed between the latch modules arranged in the second direction.

Similarly to this, the pixel circuits CR21 to CR23 comprise the latch modules LT21 to LT23 at the central portions, respectively, the pixel circuits CR31 to CR33 comprise the latch modules LT31 to LT33 at the central portions, respectively, and the pixel circuits CR41 to CR43 comprise the latch modules LT41 to LT43 at the central portions, respectively.

The connection portions CT22, CT21, and LT23 are disposed in the regions corresponding to the pixel circuits CR21, CR22, and CR23, respectively. The connection portions CT33, CT31, and CT32 are disposed in the regions corresponding to the pixel circuits CR31, CR32, and CR33, respectively. The connection portions CT42, CT41, and LT43 are disposed in the regions corresponding to the pixel circuits CR41, CR42, and CR43, respectively. The connection portions CT22, CT21, and CT23 are shifted from central portions of the pixel circuits CR21 to CR23 in the second direction Y, respectively. The connection portions CT33, CT31, and CT32 are shifted from central portions of the pixel circuits CR31 to CR33 in the second direction Y, respectively. The connection portions CT42, CT41, and CT43 are shifted from central portions of the pixel circuits CR41 to CR43 in the second direction Y, respectively.

The connection portions CT11 to CT13 in the same sub-pixel P1 are located on the same straight line along the first direction X. The latch modules LT11 to LT13 in the same sub-pixel P1 are located on the same straight line along the first direction X. The connection portions CT11 to CT13 and the connection portions CT21 to CT23 in the sub-pixels P1 and P2 adjacent in the first direction X are located on the same straight line along the first direction X. Similarly to this, the latch modules LT11 to LT13 and LT21 to LT23 are located on the same straight line along the first direction X. The connection portions CT31 to CT33 and CT41 to CT43 are located on the same straight line along the first direction X. The latch modules LT31 to LT33 and LT41 to LT43 are located on the same straight line along the first direction X.

The pixel circuits CR are equal in shape and size. In addition, the latch modules LT and the connection portions CT are disposed alternately in the second direction Y since the positions of the latch modules LT and the connection portions CT in the respective pixel circuits CR are the same. If attention is focused on the pixel circuits CR11 and CR31 adjacent in the second direction Y, for example, the latch portion LT11, the connection portion CT13, the latch module LT31 and the connection portion CT33 are disposed alternately in this order in the second direction Y.

Figure 18:
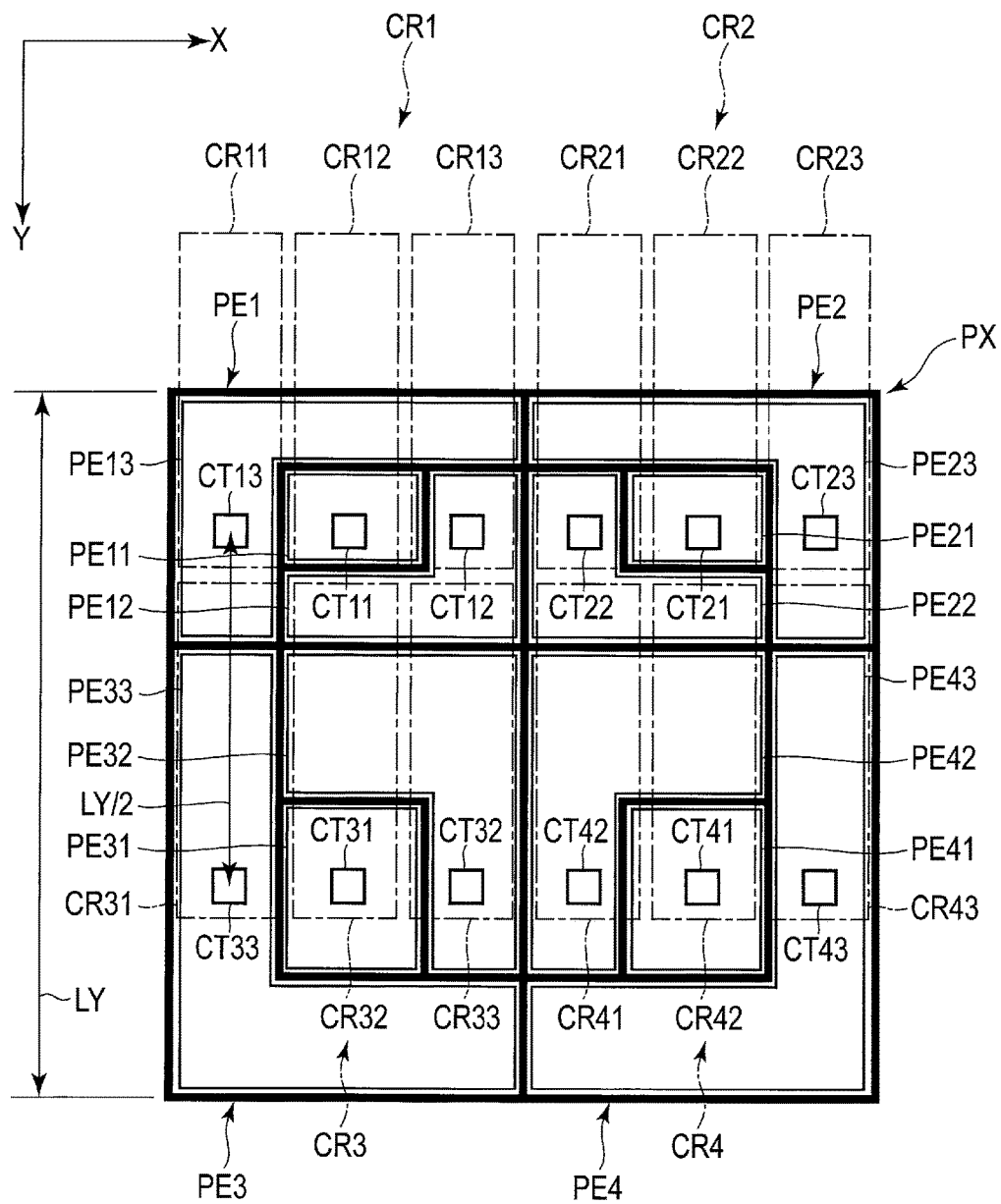
FIG. 18 is an illustration showing an example of connection between the pixel electrodes PE and the pixel circuits CR shown in FIG. 17, in the unit pixel PX of the configuration shown in FIG. 11.

FIG. 18 is an illustration showing an example of the connection between the pixel electrodes PE and the pixel circuits CR shown in FIG. 17, in the unit pixel PX of the configuration shown in FIG. 11. It should be noted that the structure of each connection portion described below has been explained with reference to FIG. 5. In addition, outer dimensions of the unit pixel PX and the sub-pixels P1 to P4 are assumed to be the regions which contribute to the display and which are sectioned by the light-shielding layer, as explained above with reference to FIG. 6.

The sub-pixel P1 comprises the electrode group PE1 including the pixel electrodes PE11 to PE13 located in the respective segments SG11 to SG13, and the circuit group CR1 including the pixel circuits CR11 to CR13. The pixel electrode PE11 is shaped in a rectangle corresponding to the shape of the segment SG11 and electrically connected with the pixel circuit CR12 by the connection portion CT11. The pixel electrode PE12 is shaped in an L letter corresponding to the shape of the segment SG12 and electrically connected with the pixel circuit CR13 by the connection portion CT12 inside the sub-area A12 shown in FIG. 6. The pixel electrode PE13 is shaped in an L letter corresponding to the shape of the segment SG13 and electrically connected with the pixel circuit CR11 by the connection portion CT13 inside the sub-area A13 shown in FIG. 6. The pixel electrode PE12 is larger in area than the pixel electrode PE11, and the pixel electrode PE13 is larger in area than the pixel electrode PE12. The area ratio of the pixel electrodes PE11 to PE13 are 1:2:4 ($=2^0:2^1:2^2$). The connection portions CT11 to CT13 are disposed at the central portion of the electrode group PE1. The pixel electrodes PE11 to PE13 are arranged in the first direction X, in the regions in which at least the connection portions CT11 to CT13 are disposed. The circuit group CR1 disposed in the sub-pixel P1 is shifted from the display area of the sub-pixel P1 in a direction (second direction Y) which intersects the direction (first direction X) of arrangement of the connection portions CT11 to CT13.

A part of the electrode group PE1 is shifted from a position overlaid on the corresponding circuit group CR1, in the second direction Y, in planar view. In addition, a part of the electrode group PE1 is overlaid on a region between the circuit group CR1 and a circuit group CR3 of the other sub-pixel P3 adjacent in the second direction Y. Furthermore, a part of the electrode group PE1 is overlaid on the circuit group CR3.

The pixel electrode PE11 is overlaid on the pixel circuit CR12. The pixel electrode PE12 is overlaid on the pixel circuits CR13 and CR33 arranged to be adjacent in the second direction Y. The pixel electrode PE13 is overlaid on the pixel circuits CR11 and CR31 arranged to be adjacent in the second direction Y. Since the control line CL2 shown in FIG. 17 extends between the circuit groups CR1 and CR3 adjacent to each other in the second direction Y, the control line CL2 is overlaid on the pixel electrodes PE12 and PE13. In addition, the control line CL2 is overlaid on the boundary between the pixel electrodes PE11 and PE12.

Similarly to this, in the sub-pixel P2, the pixel electrode PE21 is electrically connected with the pixel circuit CR22 by the connection portion CT21. The pixel electrode PE22 is electrically connected with the pixel circuit CR21 by the connection portion CT22. The pixel electrode PE23 is electrically connected with the pixel circuit CR23 by the connection portion CT23. The connection portions CT21 to CT23 are disposed at the central portion of the electrode group PE2. At least parts of the pixel electrodes PE21 to PE23 are arranged in the first direction X. A part of the electrode group PE2 including the pixel electrodes PE21 to PE23 is shifted from a position overlaid on the corresponding circuit group CR2 in the second direction Y and is overlaid on a circuit group of the other sub-pixel adjacent in the second direction Y.

In the sub-pixel P3, the pixel electrode PE31 is electrically connected with the pixel circuit CR32 by the connection portion CT31. The pixel electrode PE32 is electrically connected with the pixel circuit CR33 by the connection portion CT32. The pixel electrode PE33 is electrically connected with the pixel circuit CR31 by the connection portion CT33. The connection portions CT31 to CT33 are disposed at the central portion of the electrode group PE3. At least parts of the pixel electrodes PE31 to PE33 are arranged in the first direction X. A part of the electrode group PE3 including the pixel electrodes PE31 to PE33 is shifted from a position overlaid on the corresponding circuit group CR3 in the second direction Y and is overlaid on a circuit group CR1 of the sub-pixel P1 adjacent in the second direction Y.

In the sub-pixel P4, the pixel electrode PE41 is electrically connected with the pixel circuit CR42 by the connection portion CT41. The pixel electrode PE42 is electrically connected with the pixel circuit CR41 by the connection portion CT42. The pixel electrode PE43 is electrically connected with the pixel circuit CR43 by the connection portion CT43. The connection portions CT41 to CT43 are disposed at the central portion of the electrode group PE4. At least parts of the pixel electrodes PE41 to PE43 are arranged in the first direction X. A part of the electrode group PE4 including the pixel electrodes PE41 to PE43 is shifted from a position overlaid on the corresponding circuit group CR4 in the second direction Y and is overlaid on a circuit group CR2 of the sub-pixel P2 adjacent in the second direction Y.

The circuit groups CR1 to CR4 are shifted from the positions overlaid on the display areas of the unit pixel PX in the second direction Y. The circuit groups CR1 to CR4 are equal in length in the second direction Y and shaped in a rectangle or a square. The circuit groups CR1 to CR4 are equal in area. The length of the circuit group CR1 in the second direction Y is greater than the length of the sub-pixel P1 in the second direction Y. The length of the circuit group CR3 in the second direction Y is smaller than the length of the sub-pixel P3 in the second direction Y. A sum of the lengths of the circuit groups CR1 and CR3 in the second direction Y is equal to the length LY of the unit pixel PX in the second direction Y.

A pitch in the second direction Y between the position at which the connection portions CT11 to CT13 and CT21 to CT23 are arranged in the first direction X and the position at which the connection portions CT31 to CT33 and CT41 to CT43 are arranged in the first direction X is approximately a half of the length LY of the unit pixel PX in the second direction Y.

In the sub-pixel P1, the area (or the total area of three segments SG11 to SG13) is smaller than the total area of installation areas of the pixel circuits CR11 to CR13. Similarly to this, the area of the sub-pixel P2 is smaller than the total area of installation areas of the pixel circuits CR21 to CR23. The area of the sub-pixel P3 is larger than the total area of installation areas of the pixel circuits CR31 to CR33, and the area of the sub-pixel P4 is larger than the total area of installation areas of the pixel circuits CR41 to CR43. The area of the unit pixel PX1 is approximately equal to the total area of installation areas of twelve pixel circuits, i.e., the pixel circuits CR11 to CR13, CR21 to CR23, CR31 to CR33, and CR41 to CR43.

FIG. 19 is an illustration showing another example of the connection between the pixel electrodes PE and the pixel circuits CR shown in FIG. 17. The example shown in FIG. 19 is different from the example shown in FIG. 18 with respect to a feature that the circuit groups CR1, CR2, CR3 and CR4 are shifted in the second direction Y. A boundary between the circuit groups CR1 and CR3 is opposed to a boundary between the electrode groups PE1 and PE3. A boundary between the circuit groups CR2 and CR4 is opposed to a boundary between the electrode groups PE2 and PE4. The positions of the connection portions relative to the electrode groups are the same as those in the example shown in FIG. 18.

The pixel circuit CR11 is overlaid on the pixel electrode PE13. The pixel circuit CR12 is overlaid on the pixel electrodes PE11, PE12, and PE13. The pixel circuit CR13 is overlaid on the pixel electrodes PE12 and PE13. The pixel circuit CR21 is overlaid on the pixel electrodes PE22 and PE23. The pixel circuit CR22 is overlaid on the pixel electrodes PE21, PE22, and PE23. The pixel circuit CR23 is overlaid on the pixel electrode PE23. The pixel circuit CR31 is overlaid on the pixel electrode PE33. The pixel circuit CR32 is overlaid on the pixel electrodes PE31 and PE32. The pixel circuit CR33 is overlaid on the pixel electrode PE32. The pixel circuit CR41 is overlaid on the pixel electrode PE42. The pixel circuit CR42 is overlaid on the pixel electrodes PE41 and PE42. The pixel circuit CR43 is overlaid on the pixel electrode PE43.

The control line CL2 shown in FIG. 17 is overlaid on the boundary between the electrode groups PE1 and PE3, and the boundary between the electrode groups PE2 and PE4. The control line CL3 shown in FIG. 17 is overlaid on the pixel electrode PE33 in the electrode group PE3. In addition, the control line CL3 is overlaid on the boundary between the pixel electrodes PE33 and PE31, and the boundary between the pixel electrodes PE33 and PE32. Similarly to this, the control line CL3 is overlaid on the pixel electrode PE43 in the electrode group PE4. In addition, the control line CL3 is overlaid on the boundary between the pixel electrodes PE43 and PE41, and the boundary between the pixel electrodes PE43 and PE42.

The pixel electrodes PE and the pixel circuits CR are disposed in different layers, and the pixel electrodes PE and the control lines CL are disposed in different layers, as explained with reference to FIG. 5. For this reason, if the pixel electrodes PE are connected to the pixel circuits CR by the connection portions CT, the positions of the pixel electrodes PE are not particularly limited and may be shifted from the regions overlaid on the pixel circuits CR, and the pixel electrodes PE can be disposed irrespective of the positions of the control lines CL, as explained with reference to FIG. 18 and FIG. 19.

According to the present configuration example, the display device DSP comprises the sub-pixels P1 to P4, and the sub-pixel P1 comprises the segments SG11 to SG13. A part of the electrode group PE1 located in each of the segments SG11 to SG13 is shifted from a position overlaid on the circuit group CR1 electrically connected to the electrode group PE1. A part of the electrode group PE1 is overlaid on circuit groups of the other sub-pixels adjacent in the second direction Y. The pixel circuit CR1 is arranged in the first direction X, and the connection portions CT11 to CT13 are shifted from the central portions of the pixel circuits CR11 to CR13 in the second direction Y, respectively. The connection portions CT are arranged in the first direction X and the second direction Y with regular pitches. For this reason, a conductor (electrode) having a function of only relaying the pixel electrodes PE and the pixel circuits CR does not need to be disposed in a layer between the pixel electrodes PE and the pixel circuits CR in each of the sub-pixels P, in the display device DSP. In the present embodiment, the pixel circuits CR of the same layout and the pixel electrodes PE of different shapes can easily be connected at the connection portions CT arranged in the first direction X.

An additional manufacturing process to dispose a conductor for relay and the like is therefore unnecessary. In addition, the layout of the pixel circuits CR does not need to be changed in accordance with the shape of the segments, and the load on the circuit design can be reduced. Since the layout of each of the pixel circuits CR is not restricted by the position at which the pixel circuits are connected to the pixel electrodes PE, the pixel circuits CR can be integrated in the regions of the limited areas and the definition can be made higher.

In addition, the sub-pixel P1 comprises the rectangular segment SG11, the L-letter segment SG12 disposed along two intersecting sides 11A and 11C of the segment SG11, and the L-letter segment SG13 disposed along two other sides 11B and 11D of the segment SG11. The pixel electrodes PE11 to PE13 are disposed along the segments SG11 to SG13. Thus, variation in the position of the luminance center of the sub-pixel P1 can be made smaller in the variation in gradation. The display device capable of improving the display quality can be therefore provided. Each of the sub-pixels P1 to P4 comprises the segments SG12, SG22, SG32 and SG42 on the side of the unit pixel PX close to the geometric center PXC and the segments SG13, SG23, SG33 and SG43 on the side of the unit pixel PX remote from the geometric center PXC, and the position of the luminance center PXG of the unit pixel PX is substantially the same at each of the gradations L0 to L7. For this reason, the display device DSP can suppress image flicker in the variation in gradation and improve the display quality.

The areas of the sub-pixels P3 and P4 are larger than the areas of the sub-pixels P1 and P2. Since the sub-pixel P3 is the blue pixel, the display device DSP can correct the low luminosity of the blue pixel by the area ratio of each of the sub-pixels P1 to P4 and improve the balance of light emission in the unit pixel PX. In addition, the display device DSP can improve the luminance of the unit pixel PX by setting the white sub-pixel P4 giving a great influence to the luminance to be larger than the red sub-pixel P1 and the green sub-pixel P2. It should be noted that the areas of the sub-pixels P1 to P4 constituting the unit pixel PX can be set in accordance with hue, white balance, and the like required for the unit pixel PX. Furthermore, the display device can suppress the deterioration in gradation property since the pitches between the positions of the luminance centers PXG of the adjacent unit pixels PX are not varied at each of gradations L0 to L7. In other words, in the present embodiment, the luminance center PXG of the unit pixel PX can be made substantially the same irrespective of each of the gradations L0 to L7 while improving the color balance of the unit pixel PX by changing the size of the sub-pixels P1 and P4 corresponding to each of colors in the unit pixel PX, and the image quality can be thereby improved.

«Second Configuration Example: Light-Shielding Layer»

Next, a configuration example of the light-shielding layer BM disposed in accordance with the unit pixel PX of the present embodiment will be described.

Figure 20:
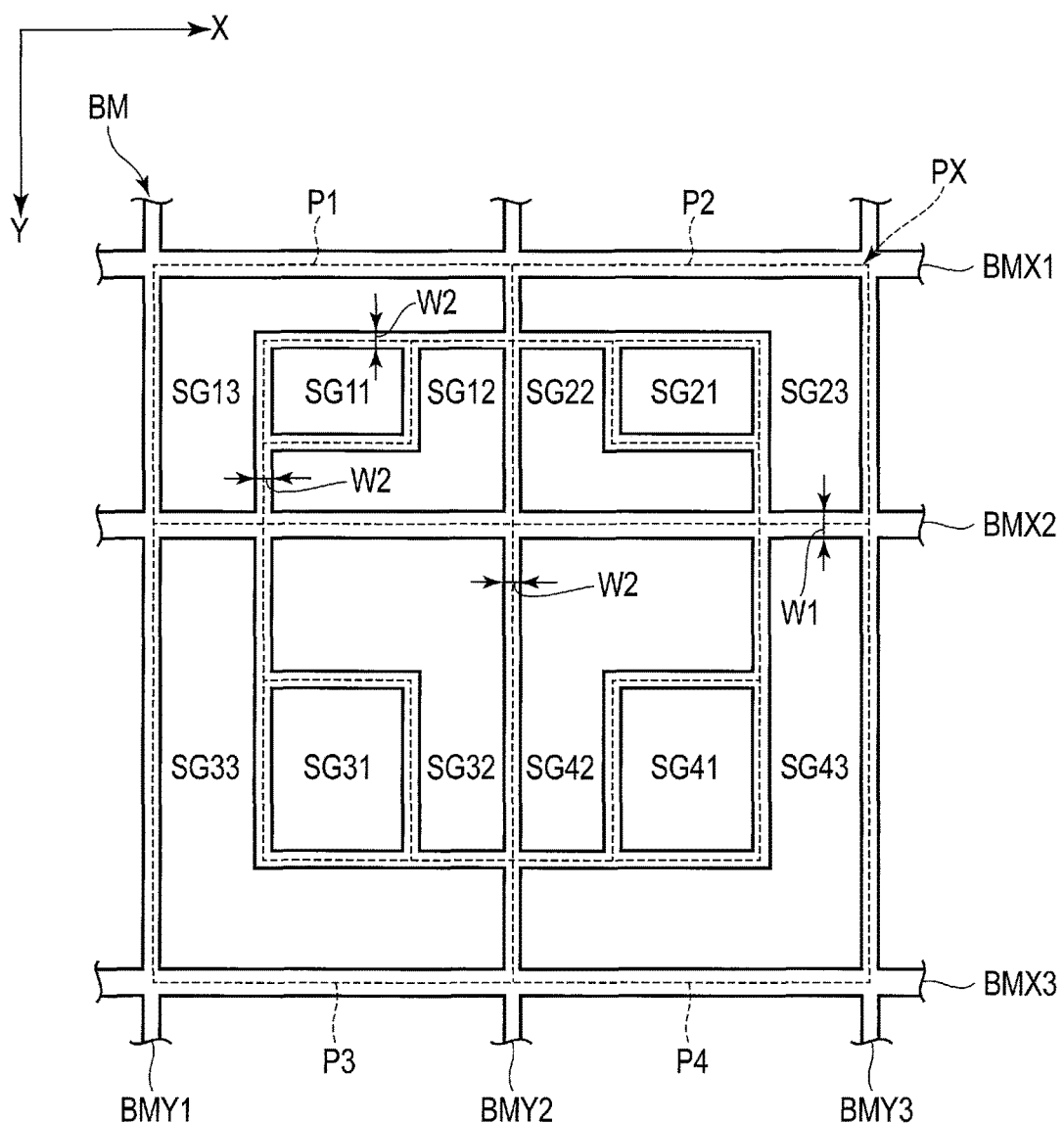
FIG. 20 is a plan view showing a configuration example of a light-shielding layer BM.

FIG. 20 is an illustration showing a configuration example of the light-shielding layer BM. The second configuration example shown in FIG. 11 is used as the configuration example of the unit pixel PX, but the first configuration example shown in FIG. 6 may be used. In the drawing, a light source is assumed to be located on a negative side of the second direction Y and a main observation angle orientation is on a positive side of the second direction Y. The main observation angle orientation corresponds to an orientation in which the direction of user's observation of the reflective display panel PNL shown in FIG. 4 is positively projected to the X-Y plane. The luminance is set to be brightest (or the reflectance is set to be highest) by allowing the light from the light source LS incident on the display panel PNL to be reflected in the main observation angle orientation and to be scattered by a diffusion layer FS. If the main observation angle orientation is on the positive side of the second direction Y, color mixing may occur in the sub-pixels arranged in the second direction Y as compared with the sub-pixels arranged in the first direction X. As regards the sub-pixels P1 and P3, for example, most of the light reflected in the sub-pixel P1 is transmitted through the green color filter disposed in the sub-pixel P1. On the other hand, part of the reflected light in the sub-pixel P1 may be transmitted through the blue color filter disposed in the sub-pixel P3 and color mixing may be thereby caused.

The light-shielding layer BM includes light-shielding portions BMX1 to BMX3 extending in the first direction X and light-shielding portions BMY1 to BMY3 extending in the second direction Y to partition the sub-pixels P1 to P4.

The light-shielding portions BMX1 to BMX3 have the same width W1. The light-shielding portions BMY1 to BMY3 have the same width W2. The width W1 is different from the width W2. For example, the width W1 of the light-shielding portion BMX2 located between the sub-pixels P1 and P2 and between the sub-pixels P3 and P4 is greater than the width W2 of the light-shielding portion BMY2 located between the sub-pixels P1 and P3 and between the sub-pixels P2 and P4. The light-shielding layer BM is also disposed between the segments constituting the sub-pixels as illustrated in the drawing. The light-shielding layer located between the segments has substantially the same width, for example, the width W2 which is the same as the width of the light-shielding portion BMY2.

According to the present configuration example, even if part of the reflected light in one of the sub-pixels arranged in the second direction Y is reflected toward the other sub-pixels, color mixing can be suppressed since the part of light is blocked by the light-shielding portion BMX2. Deterioration in display quality can be therefore suppressed.

«Third Configuration Example»

FIG. 21 is an illustration showing a third configuration example of the unit pixel PX. The third configuration example shown in FIG. 14 is different from the second configuration example shown in FIG. 11 with respect to the feature that a segment having the smallest area in each of the sub-pixels is located on the side close to the geometric center PXC of the unit pixel PX.

In each unit pixel PX, each of the segments SG11, SG21, SG31, and SG41 having the smallest area corresponds to a rectangular region located on the side closest to the geometric center PXC. Each of the segments SG13, SG23, SG33, and SG43 having the largest area corresponds to an L-letter region located on the side farthest from the geometric center PXC. The segments SG12, SG22, SG32, and SG42 correspond to L-letter regions located between the segments SG11 to SG41 having the smallest areas and the segments SG13 to SG43 having the largest areas. The sub-pixels P1 and P3 are configured to have line symmetry of the sub-pixels P2 and P4 with respect to the boundary B2. The length LYa of the sub-pixel P1 in the second direction Y is smaller than the length LYb of the sub-pixel P3 in the second direction, and the length LX/2 of the sub-pixel P1 in the first direction X is equal to the length LX/2 of the sub-pixel P2 in the first direction X. The length LYa is smaller than the length LX/2, and the length LX/2 is smaller than the length LYb.

In the third configuration example, too, the same advantages as those of the above-explained examples can be obtained.

«Comparative Example»

FIG. 22 is an illustration showing a comparative example of the unit pixel PX. The comparative example shown in FIG. 22 is different from the first configuration example shown in FIG. 6 with respect to the feature that a segment having the smallest area in each of the sub-pixels is located on the side close to the geometric center PXC of the unit pixel PX.

When attention is focused on the sub-pixel P1, the segment SG11 having the smallest area corresponds to a rectangular region located on the side closest to the geometric center PXC, the segment SG13 having the largest area corresponds to an L-letter region located on the side farthest from the geometric center PXC, and the segment SG12 corresponds to an L-letter region located between the segments SG11 and SG13. The sub-pixel P2 is configured to have line symmetry of the sub-pixel P1 with respect to the boundary B2. The sub-pixel P3 is configured to have line symmetry of the sub-pixel P1 with respect to the boundary B1. The sub-pixel P4 is configured to have point symmetry of the sub-pixel P1 with respect to the geometric center PXC. Each of the sub-pixels P1 to P4 comprises pixel electrodes of shapes corresponding to respective segments.

A layout of connection portions which connect the pixel circuits shown in FIG. 7 with the pixel electrodes in the illustrated comparative example will be reviewed.

First, the layout of the connection portions CTA represented by circles ○ in the drawing will be reviewed. Three connection portions CTA located in the sub-pixel P1 are arranged in the first direction X. For this reason, three pixel circuits corresponding to the segments SG11 to SG13 can be designed in the same layout. When attention is focused on the sub-pixels P1 and P3 arranged in the second direction Y, the connection portions CTA are located to have line symmetry with respect to the boundary B1. For this reason, the same layout cannot be used for the pixel circuits of the respective segments SG11 and SG31 arranged in the second direction Y, and the connection portions need to be disposed at positions having line symmetry with respect to the boundary B1. In other words, twelve pixel circuits and the pixel electrodes are connected to each other in the illustrated unit pixel PX, but different layouts need to be used for six pixel circuits of an upper part of the boundary B1 and six pixel circuits of a lower part.

Next, the layout of connection portions CTB represented by squares □ in the drawing will be reviewed. Three connection portions CTB located in the sub-pixel P1 are arranged radially from the geometric center PXC. For this reason, three pixel circuits corresponding to the segments SG11 to SG13 need to be designed in different layouts. In the other sub-pixels, too, corresponding three pixel circuits are naturally designed in different layouts.

Thus, the pixel circuits of the same layout and the pixel electrodes of different shapes cannot easily be connected in the comparative example. To enable the same connection of the present embodiment to be made, a conductor or the like for relaying the pixel electrodes and the pixel circuits is required, and the increase in the manufacturing processes and the increase in the manufacturing costs are caused.

According to the present embodiment, as described above, the display device comprising the segments in the respective pixels disposed simply and compactly in the configuration using the area gradation method can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a unit pixel comprising first to fourth sub-pixels exhibiting different colors,
each of the first to fourth sub-pixels comprising first to third segments for displaying 3-bit gradation,
the first segment being a rectangular region including first to fourth sides,
the second segment being an L-letter region located on a side closer to a geometric center of the unit pixel than the first segment and formed along the first and second sides which intersect each other,
the third segment being an L-letter region located on a side farther from the geometric center than the first segment and formed along the third and fourth sides which intersect each other,
a first pixel electrode located in the first segment;
a second pixel electrode located in the second segment;
a third pixel electrode located in the third segment;
a first pixel circuit supplying either of signal potentials corresponding to binary gradation to the first pixel electrode;
a second pixel circuit supplying either of signal potentials corresponding to binary gradation to the second pixel electrode;
a third pixel circuit supplying either of signal potentials corresponding to binary gradation to the third pixel electrode;
a first connection portion making electric connection between the first pixel electrode and the first pixel circuit;
a second connection portion making electric connection between the second pixel electrode and the second pixel circuit; and
a third connection portion making electric connection between the third pixel electrode and the third pixel circuit,
wherein
a first boundary located between not only the first sub-pixel and the third sub-pixel but also the second sub-pixel and the fourth sub-pixel extends in a first direction,
the third pixel circuit, the first pixel circuit, and the second pixel circuit are arranged in this order in the first direction, and
the first to third connection portions are located on a same straight line extending in the first direction.

2. The display device of claim 1, wherein
each of the first and second sub-pixels occupy a first area of the unit pixel, and
each of the third and fourth sub-pixels occupy a second area larger than the first area of the unit pixel.

3. The display device of claim 2, wherein
a length in the first direction is greater than a length in a second direction intersecting the first direction, in the first and second sub-pixels, and
a length in the first direction is smaller than a length in the second direction, in the third and fourth sub-pixels.

4. The display device of claim 1, wherein
one of the first and second sub-pixels exhibits a green color,
the other of the first and second sub-pixels exhibits a red color,
one of the third and fourth sub-pixels exhibits a blue color, and
the other of the third and fourth sub-pixels exhibits a white color.

5. The display device of claim 1, further comprising:
a first light-shielding portion which is located between not only the first sub-pixel and the third sub-pixel but also the second sub-pixel and the fourth sub-pixel formed along the first direction, and has a first width in a second direction intersecting the first direction; and
a second light-shielding portion which is located between not only the first sub-pixel and second sub-pixel but also the third sub-pixel and the fourth sub-pixel formed along the second direction, and has a second width in the first direction, wherein
the first width is different from the second width.

6. The display device of claim 5, wherein
the first width is greater than the second width.

7. The display device of claim 1, wherein
an area ratio of the first segment, the second segment and the third segment is 1:2:4.

8. The display device of claim 1, wherein
a rectangular region formed by combining with the first segment and the second segment is geometrically similar to a rectangular region of the first segment.

9. The display device of claim 1, wherein
a rectangular region formed by combining with the first segment, the second segment and the third segment is geometrically similar to a rectangular region of the first segment.

10. The display device of claim 1, wherein
each of the first and second sub-pixels occupy a first area of the unit pixel,
each of the third and fourth sub-pixels occupy a second area different from the first area of the unit pixel, and a luminance center position of the unit pixel is substantially a same in a state of displaying each gradation and different from a position of the geometric center of the unit pixel.

11. The display device of claim 10, wherein
the unit pixel is formed in a rectangular shape or a square shape, and
the position of the geometric center is a position of a intersection point of two diagonal lines in the shape.

12. The display device of claim 11, further comprising:
a second boundary which is located between not only the first sub-pixel and the second sub-pixel but also the third sub-pixel and the fourth sub-pixel formed along a second direction intersecting the first direction,
wherein
the geometric center and the luminance center are located on the second boundary.

13. The display device of claim 12, wherein
the position of the luminance center is substantially the same as a intersection point of the first boundary and the second boundary.

14. The display device of claim 1, wherein
each of the first to fourth sub-pixels comprises:
an electrode group including the first to third pixel electrodes; and
a circuit group including the first to third pixel circuits, and
a part of the electrode group of the first sub-pixel is shifted from a position overlaid on the circuit group of the first sub-pixel in planar view.

15. The display device of claim 14, wherein
a part of the electrode group of the first sub-pixel is overlaid on a region between the circuit group of the first sub-pixel and the circuit group of the other sub-pixel adjacent to the first sub-pixel.

16. The display device of claim 14, wherein
a part of the electrode group of the first sub-pixel is overlaid on the circuit group of the other sub-pixel adjacent to the first sub-pixel.

17. The display device of claim 14, wherein
each of the first to third pixel circuits is formed in a region in which a length in the first direction is smaller than a length in a second direction, and
the electrode group of the first sub-pixel is shifted from the circuit group of the first sub-pixel in the second direction.

18. The display device of claim 17, wherein
a connection portion making connection between the first pixel electrode and the first pixel circuit is shifted from a central portion of the first pixel circuit in the second direction.

19. The display device of claim 1, wherein
the third connection portion, the first connection portion, and the second connection portion are arranged in this order in the first direction, and
the first to third connection portions are arranged in the first direction with regular pitches.

20. A display device comprising:
a unit pixel comprising first to fourth sub-pixels exhibiting different colors,
each of the first to fourth sub-pixels comprising first to third pixel electrodes for displaying 3-bit gradation,
the first pixel electrode being a rectangular region including first to fourth sides,
the second pixel electrode being an L-letter region located on a side closer to a geometric center of the unit pixel than the first pixel electrode and formed along the first and second sides which intersect each other,
the third pixel electrode being an L-letter region located on a side farther from the geometric center than the first pixel electrode and formed along the third and fourth sides which intersect each other,
a first pixel circuit supplying either of signal potentials corresponding to binary gradation to the first pixel electrode;
a second pixel circuit supplying either of signal potentials corresponding to binary gradation to the second pixel electrode;
a third pixel circuit supplying either of signal potentials corresponding to binary gradation to the third pixel electrode;
a first connection portion making electric connection between the first pixel electrode and the first pixel circuit;
a second connection portion making electric connection between the second pixel electrode and the second pixel circuit; and
a third connection portion making electric connection between the third pixel electrode and the third pixel circuit,
wherein
the first sub-pixel and the second sub-pixel are arranged in a first direction,
the third sub-pixel and the fourth sub-pixel are arranged in the first direction,
the first sub-pixel and the third sub-pixel are arranged in a second direction crossing the first direction, and
the second sub-pixel and the fourth sub-pixel are arranged in the second direction,
a first boundary located between not only the first sub-pixel and the third sub-pixel but also the second sub-pixel and the fourth sub-pixel extends in the first direction,
distances from the first to third connection portions to the first boundary is the same.

* * * * *